United States Patent
Kavirayani

(10) Patent No.: US 12,368,586 B2
(45) Date of Patent: Jul. 22, 2025

(54) KEY VERSION MANAGEMENT IN STORAGE DEVICES

(71) Applicant: Western Digital Technologies, Inc., San Jose, CA (US)

(72) Inventor: Chaitanya Kavirayani, Karnataka (IN)

(73) Assignee: Sandisk Technologies, Inc., Milpitas, CA (US)

( * ) Notice: Subject to any disclaimer, the term of this patent is extended or adjusted under 35 U.S.C. 154(b) by 210 days.

(21) Appl. No.: 18/349,830

(22) Filed: Jul. 10, 2023

(65) Prior Publication Data

US 2024/0275592 A1    Aug. 15, 2024

Related U.S. Application Data

(60) Provisional application No. 63/484,900, filed on Feb. 14, 2023.

(51) Int. Cl.
  *H04L 9/08* (2006.01)
  *G06F 12/02* (2006.01)
  *G06F 12/14* (2006.01)

(52) U.S. Cl.
  CPC ........ *H04L 9/0891* (2013.01); *G06F 12/0292* (2013.01); *G06F 12/1408* (2013.01); *G06F 2212/1052* (2013.01)

(58) Field of Classification Search
  CPC . H04L 9/0891; G06F 12/0292; G06F 12/1408
  See application file for complete search history.

(56) References Cited

U.S. PATENT DOCUMENTS

| | | | |
|---|---|---|---|
| 9,690,652 B2 | 6/2017 | Kanno | |
| 9,811,477 B2 * | 11/2017 | Meyer | H04L 9/0891 |
| 10,587,590 B2 * | 3/2020 | Trantham | H04L 63/0457 |
| 10,664,414 B2 * | 5/2020 | Lin | H04L 9/0894 |
| 10,922,242 B2 * | 2/2021 | Lappi | G06F 12/1009 |
| 2012/0079289 A1 * | 3/2012 | Weng | G06F 21/79 713/193 |
| 2016/0246830 A1 * | 8/2016 | Chiu | G06F 16/1734 |
| 2020/0242257 A1 | 7/2020 | Trantham | |

OTHER PUBLICATIONS

Ross Stenfort, Ta-Yu Wu, Lee Prewitt, Paul Kaler, David Derosa, William Lynn, Austin Bolen, "Open Compute Project", Datacenter NVMe® SSD Specification, Version 2.0, Jul. 30, 2021.

* cited by examiner

*Primary Examiner* — Shanto Abedin
(74) *Attorney, Agent, or Firm* — ARENTFOX SCHIFF LLP

(57) ABSTRACT

Aspects of a storage device are provided for managing a key version used for encryption and decryption and processing host commands associated with sanitized and non-sanitized logical pages using cryptographic erase. A controller of the storage device updates, in response to a sanitize command, a current address offset associated with the KV from a first address offset to a second address offset without changing the KV. In response to a subsequent read command, the controller determines whether the KV mismatches an expected KV obtained from the metadata beginning at the second address offset but matches or mismatches an expected KV obtained from the metadata beginning at the first address offset. The controller transmits garbage data decrypted using a different KV than the KV if a match, or an error message indicating a KV mismatch error if a mismatch. Thus, the controller may avoid returning garbage data for non-sanitized logical pages.

20 Claims, 11 Drawing Sheets

KEY VERSION MANAGEMENT IN STORAGE DEVICES

CROSS REFERENCE TO RELATED APPLICATION(S)

This application claims the benefit of U.S. Provisional Application Ser. No. 63/484,900, entitled "KEY VERSION MANAGEMENT IN STORAGE DEVICES" and filed on Feb. 14, 2023, the disclosure of which is expressly incorporated by reference herein in its entirety.

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, pages, or blocks, in the flash memory. The control tables are stored in the non-volatile memory to enable access to the stored data after a power cycle.

The flash storage device may include a sector processing engine (SPE) implemented in hardware, firmware/software, or a combination of firmware/software and hardware which encrypts (or encodes) and decrypts (or decodes) data in various sectors of flash memory using a key version. A key version may also be referred to as a media encryption key (MEK). The SPE may maintain a key version for each range of logical addresses or namespaces defined in the storage device. For example, if the flash storage device includes a single range of logical addresses or a single namespace, the SPE may maintain one key version for its namespace, while if the flash storage device includes 128 ranges of logical addresses or 128 namespaces, the SPE may maintain a different key version for each namespace (or 128 key versions in total).

SUMMARY

One aspect of a storage device is disclosed herein. The storage device includes a controller configured to: write a key version in metadata of a logical page beginning at a first address offset; update, in response to reception of a sanitize command after the key version is written, a current address offset associated with the key version from the first address offset to a second address offset without changing the key version; determine, in response to subsequent reception of a read command for the logical page, whether the key version mismatches an expected key version obtained from the metadata beginning at the second address offset but matches an expected key version obtained from the metadata beginning at the first address offset; and transmit to a host device, in response to the determination, garbage data resulting from decryption using a different key version than the written key version of data in the logical page.

Another aspect of a storage device is disclosed herein. The storage device includes a controller configured to: update, in response to a sanitize command from a host device, a current address offset associated with a key version from a first address offset to a second address offset without changing the key version; write, after the current address offset is updated, the key version in metadata of a logical page beginning at the second address offset; determine, in response to subsequent reception of a read command for the logical page from the host device, whether the key version mismatches an expected key version obtained from the metadata beginning at the second address offset and further mismatches an expected key version obtained from the metadata beginning at the first address offset; and transmit, in response to the determination, an error message to the host device indicating a key version mismatch error.

A further aspect of a storage device is disclosed herein. The storage device includes a controller configured to: write a key version in metadata of a logical page beginning at a kth address offset, where k>0; update, in response to reception of a $k^{th}$ sanitize command from a host device after the key version is written, a current address offset associated with the key version from the $k^{th}$ address offset to a $k+1^{th}$ address offset; determine, in response to subsequent reception of a read command for the logical page from the host device, whether the key version mismatches an expected key version obtained from the metadata at the $k+1^{th}$ address offset but matches one of a plurality of expected key versions respectively obtained from the metadata at different address offsets including at least the $k^{th}$ address offset; and transmit, in response to the determination, garbage data resulting from decryption using a different key version than the written key version of data in the logical page.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
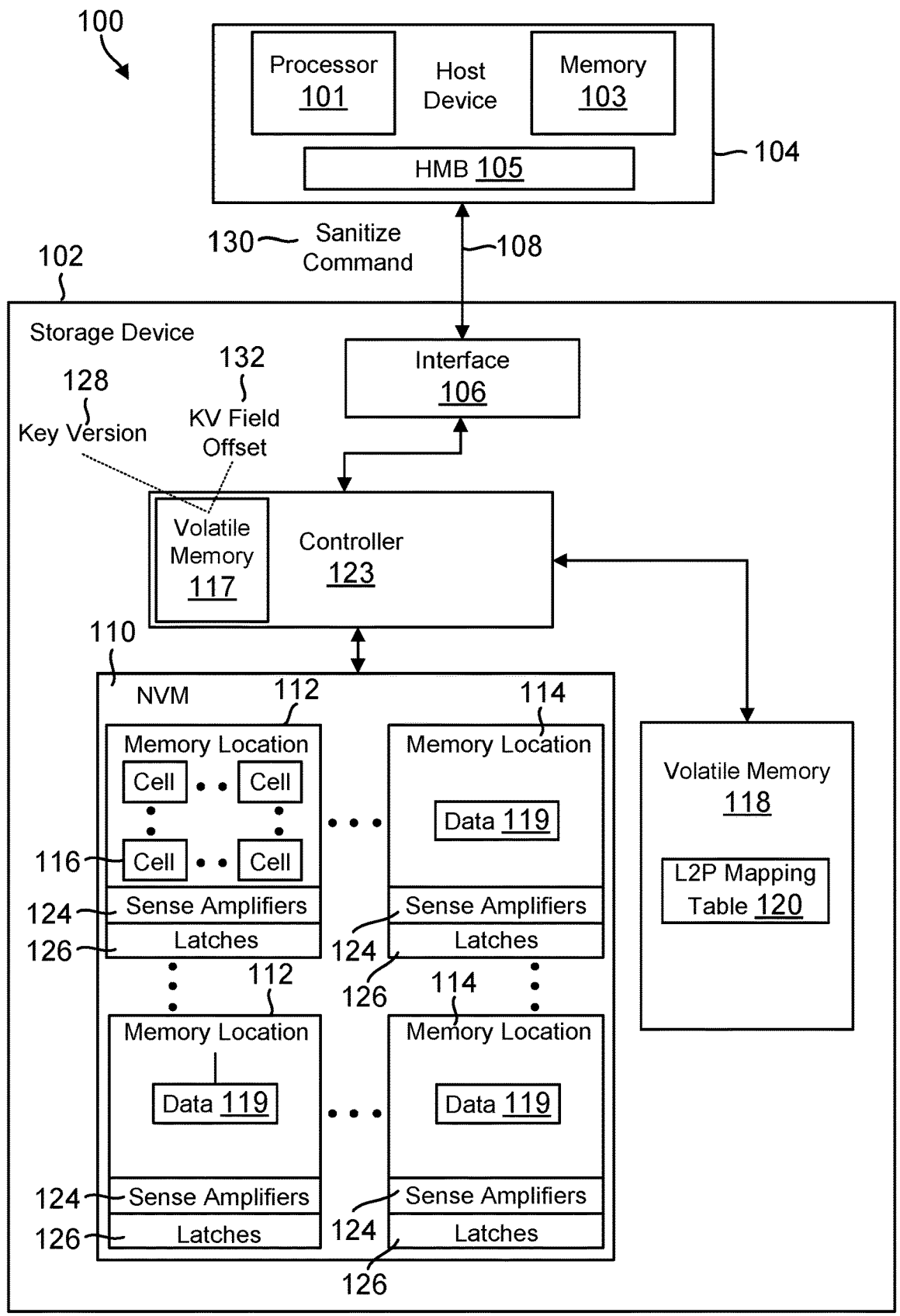
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

A storage device may include a controller that writes and reads data in non-volatile memory. The controller may encrypt data that is to be written to the memory using a key version (e.g., a media encryption key), and the controller may decrypt data that is to be read from the memory using the same key version. For example, a sector processing engine (SPE) in the controller may maintain this key version and perform encryption and decryption of data using the key version. Whenever the SPE writes data to a logical address in a given namespace, the SPE encrypts the data using the associated key version and stores the key version in metadata associated with the logical address. Similarly, whenever the SPE reads data from a logical address in a given namespace, the SPE verifies the key version in the metadata and if verification is successful, the SPE decrypts the data using the key version and returns the data to a host device.

When processing a write command including data from a host device and indicating a logical page in which the data is to be written, the controller or SPE may encrypt the data using the key version, write the encrypted data in a physical page mapped to the logical page, and store the key version in metadata associated with that logical page. For example, the controller or SPE may store the key version in a key version field in metadata associated with that logical page. In addition to the key version, this metadata may include other parameters. The controller may append this metadata to the data and write the combined data and metadata to the physical page of non-volatile memory. Similarly, when processing a read command for this data written to the logical page, the controller may read the encrypted data and key version from the logical page, decrypt the data using the read key version in response to a successful verification of the key version, and return the decrypted data to the host device.

After data is written to one or more logical pages of the storage device, the host may determine to send a sanitize command to the storage device to alter user data in its non-volatile memory such that recovery of previous user data is not possible. Examples of sanitize commands include block erase sanitize operations (which alter user data with a block erase method), a cryptographic erase sanitize operation (which alter user data by changing media encryption keys), and an overwrite sanitize operation (which alter user data by writing a data pattern to media locations in which user data may be stored). In the specific case where the host transmits and the controller receives a sanitize command indicating a cryptographic erase, the controller or SPE may change its maintained key version to a new key version in response to the command, causing subsequent read commands for data encrypted using the previous key version to fail as a result and thus the data to not be recoverable.

For example, the controller may initially write encrypted data to various logical pages using one media encryption key (MEK) or key version KV1, and later receive a sanitize command (cryptographic erase) from the host resulting in the controller or SPE changing its associated key version to new MEK or key version KV2. In such case, when the controller subsequently receives a read command for host data previously encrypted in a logical page using KV1, the controller may read the stored key version KV1 from the associated metadata, compare the read key version KV1 with the new associated key version KV2, and determine a key version mismatch since KV1 is not equal to KV2. As a result, the controller may fail the read command since the controller cannot successfully decrypt the encrypted data with a mismatched key version, consequently returning a fixed data pattern indicating the failed read command to the host and fulfilling the purpose of the sanitize operation of rendering the data unrecoverable.

However, following such sanitize operations, the host device may expect certain storage devices (e.g., SSDs for use in datacenters) to allow host reads of sanitized logical addresses so that the host may validate sanitized areas in these storage devices. For example, following a cryptographic erase in a storage device that changes a MEK, the host may expect such storage devices to enable reads to sanitized logical block addresses (LBAs) to meet validation of sanitized areas, including that the storage device returns garbage data (e.g., garbled data, nonsensical data, or the like) generated from decryption at those LBAs using the new MEK. Also if a read operation occurs to a sanitized LBA prior to that LBA being written, the host may also expect such storage devices to not report a media error because the LBA has not been written. Therefore, to meet the host's expectation, rather than failing a read command of a sanitized logical page, these storage devices may instead read the data from the non-volatile memory, decrypt the data using the new key version (notwithstanding the mismatch between this key version and the stored key version used to encrypt the read data), and return the garbage data to the host device in response to the read command to allow the host to perform sanitization validation. For instance, in the example above where following a sanitize operation a key version mismatch exists between KV1 and KV2, the controller may decrypt the data using KV2 even though the data was encrypted using KV1, and the controller may return the resulting garbage data to the host for validation purposes.

Yet, while returning garbage data generated from decryption using a wrong key version due to a KV mismatch does allow the storage device to comply with the host's expectation for sanitized commands, this approach may improperly result in the storage device handling read commands that result in KV mismatches due to genuine device errors in a same manner. For instance, if following a cryptographic erase, a data overwrite occurs using the new key version, but during the write operation or a subsequent read operation for the overwritten data, a bit flip or other error in the metadata causes a KV mismatch to occur between the stored key version and the new key version, then the controller may not be able to distinguish between KV mismatches due to sanitization and KV mismatches due to bit errors. This situation may result in the controller improperly returning garbage data for both sanitized and non-sanitized logical pages or LBAs to avoid failing to comply with the host's expectation for sanitized commands.

As an example, assume that the controller receives write commands to respectively write data to logical pages A and B using KV1, then receives a sanitize command to change its associated KV from KV1 to KV2. Assume further in this example that the controller receives, following the sanitize command, another write command to overwrite data in logical page B (in which case the controller will use KV2), and afterwards receives a read command for logical pages A and B respectively. In the case of logical page A, if the controller or SPE follows the aforementioned process for supporting host validation of sanitized commands, the controller may read KV1 from the metadata of logical page A, decrypt the data in logical page A using KV2 irrespective of there being a mismatch between KV2 and KV1, and return the garbage data resulting from the decryption to the host for logical page A. In the case of logical page B, the expected result is that the controller will read KV2 from the metadata of logical page B, decrypt the data in logical page B successfully using KV2, and return the decrypted data to the host for logical page B. But if the controller misreads the stored key version in the metadata of logical page B as KVx due to a bit flip or other device error, then if the controller or SPE again follows the aforementioned process for supporting host validation of sanitized commands, then rather than failing the read command, the controller may end up decrypting the data in logical page B using KVx notwithstanding the mismatch between KV2 and KVx, and return the garbage data resulting from the improper decryption to the host for logical page B.

One approach that may be applied to prevent this situation from occurring is to place the storage device in a read only mode following reception of a sanitize command. Such approach would prevent data overwrites following a sanitize operation from occurring in the first place, and thereby prevent the controller from returning garbage data improperly for non-sanitized logical pages or LBAs. However, placing the storage device in a read only mode after a sanitize command is inefficient, especially since the host may send multiple sanitize commands between various write and read commands.

Another approach that may be applied to prevent this situation from occurring is to maintain, in a logical-to-physical (L2P) mapping table that maps logical pages to physical pages in the non-volatile memory, an additional bit which indicates whether a given logical page is a sanitized logical page (e.g., logical page A in the example above) or a non-sanitized logical page (e.g., logical page B in the example above). In such case, if the controller determines a KV mismatch between a current associated KV following a recent sanitize command and a stored or misread KV in a read logical page responsive to a read command, the controller may determine whether the logical page is sanitized or not from this additional bit in the L2P mapping table, and the controller may handle the read command differently depending on the bit value. However, managing such an L2P mapping table for distinguishing between sanitized and non-sanitized logical pages may be similarly inefficient, since maintaining a bit for every logical page in the L2P mapping table may be costly.

Therefore, it would be helpful if the controller were to be able to efficiently distinguish KV mismatches in sanitized logical pages with KV mismatches in non-sanitized logical pages. In particular, it would be helpful if the controller were configured such that KV mismatches occurring for sanitized logical pages trigger the controller to pass read commands for these pages and send garbage data resulting from decryption using the wrong KV to the host, while KV mismatches occurring for non-sanitized (overwritten or re-written) logical pages trigger the controller to fail read commands for these pages and return an error message to the host. To this end, aspects of the present disclosure provide a controller that is configured to manage or process KVs in response to a sanitize command differently than that previously described. More specifically, instead of changing the KV (e.g., from KV1 to KV2) in response to a cryptographic erase, the controller maintains the same KV (e.g., KV1) but updates or changes an offset in metadata (e.g., an address pointer) at which the KV may be stored in response to subsequent write commands. For instance, the controller or SPE may maintain an offset variable in memory which is modified whenever a sanitize command indicating a cryptographic erase is received, and whenever the controller receives a subsequent write command indicating a logical page, the controller or SPE writes the KV in the metadata associated with that logical page beginning at the address indicated by that offset. Thus, following a single sanitize command, sanitized logical pages would store the KV beginning at one (or no) offset (e.g., 0 bytes with respect to the beginning of a KV field in metadata) while non-sanitized logical pages would store the same KV beginning at a different offset (e.g., 1 byte with respect to the beginning of the KV field in metadata).

Later on, when the controller receives a read command to read data from a logical page, the controller may determine whether the logical page is sanitized or not based on whether a KV mismatch occurs in response to a read KV at the updated offset associated with the controller or SPE, and handle the read command accordingly. For instance, the controller may initially read an expected KV from metadata associated with a logical page at current offset '1', and if the KV maintained by the controller matches the expected KV, the controller may determine the KV was read successfully from a non-sanitized page and the controller may return the decrypted data to the host. If the KV maintained by the controller does not match the expected KV, the KV mismatch could be either because the KV was stored beginning at address offset '0' prior to the sanitize command rather than beginning at address offset '1' (the logical page is sanitized), or because a bit error occurred during writing or reading of the KV at offset '1' (the logical page is not sanitized and a genuine device error occurred causing the KV mismatch) or at offset '0' (the logical page is sanitized but a genuine device error still occurred). Therefore, to determine which case applies to this logical page, the controller may again read an expected KV from the metadata associated with that logical page but this time beginning at prior offset '0'. If the KV maintained by the controller this time matches the expected KV, the controller may determine the KV was read successfully from a sanitized page and the controller may return garbage data resulting from decryption of the logical page using a different KV than the expected KV to the host for sanitization validation purposes. However, if the KV again does not match the expected KV, the controller may determine an error occurred (irrespective of whether the page is sanitized or not) and so the controller may return a read error indicating a failure to execute the read command.

As a result, the controller may efficiently differentiate KV mismatches in sanitized and non-sanitized logical pages, and therefore refrain from improperly returning garbage data resulting from decryption of non-sanitized logical pages, in the event of a device error in reading the KV following a sanitize and subsequent write. For instance, in the aforementioned example of sanitized logical page A and overwritten (no longer sanitized) logical page B, instead of storing different KVs in respective KV fields of associated metadata for logical pages A and B, here the controller (e.g., its SPE) maintains an offset value updated after each sanitize command and stores the same KV beginning at a different address offset in the metadata for each logical page (e.g., at offset '0' for logical page A and offset '1' for logical page B). Therefore, if a read command for logical page A is received and the controller determines a KV mismatch occurs at offset '1' but not at offset '0', the controller may determine logical page A is sanitized, consequently pass the read command, read the encrypted data from the logical page, decrypt the encrypted data in that logical page using a different KV to result in garbage data, and return the garbage data to the host device. In contrast, if a read command for logical page B is received and the controller determines a KV mismatch occurs both at offsets '1' and at offset '0', the controller may determine a device error occurred, consequently fail the read command, and provide a read error message to the host device.

Moreover, this concept may be extended to multiple sanitize commands which the host may send to the storage device between various reads and/or writes, in which case the controller may change the offset used for storing the KV in subsequent logical pages in response to each sanitize command as well as consider each prior offset when checking a logical page for KV mismatches in response to a read command. For example, if the KV for logical page A was still stored at offset '0' following n sanitize commands, the controller may compare the expected KV read from n different offsets until a KV match has occurred (in which case the controller determines logical page A is sanitized and returns garbage data accordingly) or until a KV mismatch has occurred in all n different offsets (in which case the controller determines a device error occurred for logical page A and fails the read command accordingly).

Thus, for logical pages that have been sanitized or which encountered a device error (either following a single or multiple sanitize commands), at least one KV mismatch may occur at a given offset, and so the controller may perform multiple KV comparisons at different KV field offsets for these pages. However, for logical pages that are not sanitized, or alternatively for which the controller has not encountered drive errors, fast read command completion may be maintained since the controller may perform a single KV comparison at an initial KV field offset and determine a match between KVs without encountering any KV mismatches. Thus, these logical pages may maintain their input/output (I/O) performance.

Additionally, while the concepts related to KV management described throughout this disclosure refer to the example where a single KV is maintained for a single namespace in the storage device, the concepts may similarly be extended to other examples where multiple KVs are maintained respectively for different namespaces or for different ranges of LBAs in a same namespace in the storage device. In such examples, whenever the controller receives a sanitize command indicating a cryptographic erase for a particular namespace or range of LBAs, the controller may update an offset associated with the KV for that particular namespace or LBA range without changing the KV associated with that namespace or LBA range, and perform KV comparisons at different offsets in metadata of logical pages in that namespace or LBA range beginning at the updated offset for that namespace or LBA range as previously described. Thus, the controller may maintain and apply a separate KV field offset for each namespace or for each LBA range in a same namespace. Alternatively, if the controller receives a sanitize command indicating a cryptographic erase for the storage device (e.g., multiple or all namespaces), the controller may similarly update an offset for each of these multiple namespaces or LBA ranges and perform KV comparisons using the offsets respectively for these namespaces or LBA ranges, or the controller may alternatively update and apply a single offset for these namespaces or LBA ranges in the storage device as a whole.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host 104 may also include a host memory buffer (HMB 105). The HMB 105 is a portion of host memory (e.g., host memory 103 or a different memory in host 104) that the host 104 may allocate to the storage device 102 to utilize for the storage device's own purposes. For instance, the storage device 102 may utilize the HMB 105 as an address mapping table cache or a data cache. In some examples, the HMB 105 may include volatile memory, such as RAM, DRAM, or SDRAM (e.g., DDR1, DDR2, DDR3, DDR3L, LPDDR3, DDR4, and the like). In other examples, the HMB 105 may include non-volatile memory.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of NVM memory locations 112 which may store system data for operating the storage device 102 or user data received from the host for storage in the storage device 102. For example, the NVM may have a cross-point architecture including a 2-D NAND array of NVM memory locations 112 having n rows and m columns, where m and n are predefined according to the size of the NVM. In the exemplary embodiment of FIG. 1, each NVM memory location 112 may be a die 114 including multiple planes each including multiple blocks of multiple cells 116. Alternatively, each NVM memory location 112 may be a plane including multiple blocks of the cells 116. The cells 116 may be single-level cells, multi-level cells, triple-level cells, quad-level cells, and/or penta-level cells, for example. Other examples of NVM memory locations 112 are possible; for instance, each NVM memory location may be a block or group of blocks. Each NVM memory location may include one or more blocks in a 3-D NAND array. Each NVM memory location 112 may include one or more logical blocks which are mapped to one or more physical blocks. Alternatively, the memory and each NVM memory location may be implemented in other ways known to those skilled in the art.

The storage device 102 also includes one or more volatile memories 117, 118 that can, for example, include a Dynamic Random Access Memory (DRAM) or a Static Random Access Memory (SRAM). For example, as illustrated in FIG. 1, volatile memory 117 may be an SRAM internal to (or integrated into) controller 123 of the storage device 102, while volatile memory 118 may be a DRAM external to (or remote from) controller 123 of the storage device 102. However, in other examples, volatile memory 117 may be a DRAM external to controller 123 and volatile memory 118 may be an SRAM internal to controller 123, volatile memory 117, 118 may both be internal to controller 123 or both be external to controller 123, or alternatively, storage device 102 may include only one of volatile memory 117, 118. Data stored in volatile memory 117, 118 can include data read from the NVM 110 or data to be written to the NVM 110. In this regard, the volatile memory 117, 118 can include a write buffer or a read buffer for temporarily storing data.

The memory (e.g. NVM 110) is configured to store data 119 received from the host device 104. The data 119 may be stored in the cells 116 of any of the NVM memory locations 112. As an example, FIG. 1 illustrates data 119 being stored in different NVM memory locations 112, although the data may be stored in the same NVM memory location. In another example, the NVM memory locations 112 may be different dies, and the data may be stored in one or more of the different dies.

Each of the data 119 may be associated with a logical address. For example, the volatile memory 118 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a physical address associated with each memory location 112 in the NVM where data is stored. While FIG. 1 illustrates a single L2P mapping table 120 stored in volatile memory 118, in other examples, the L2P mapping table 120 may include multiple tables stored in volatile memory 118. Mappings may be updated in the L2P mapping table 120 respectively in response to host writes, and periodically the L2P mapping table 120 may be flushed from volatile memory 118 to one or more of the NVM memory locations 112 of NVM 110 so that the mappings may persist across power cycles. In the event of a power failure in storage device 102, the L2P mapping table 120 in volatile memory 118 may be recovered during initialization from the L2P entries previously stored in NVM 110.

Figure 2:
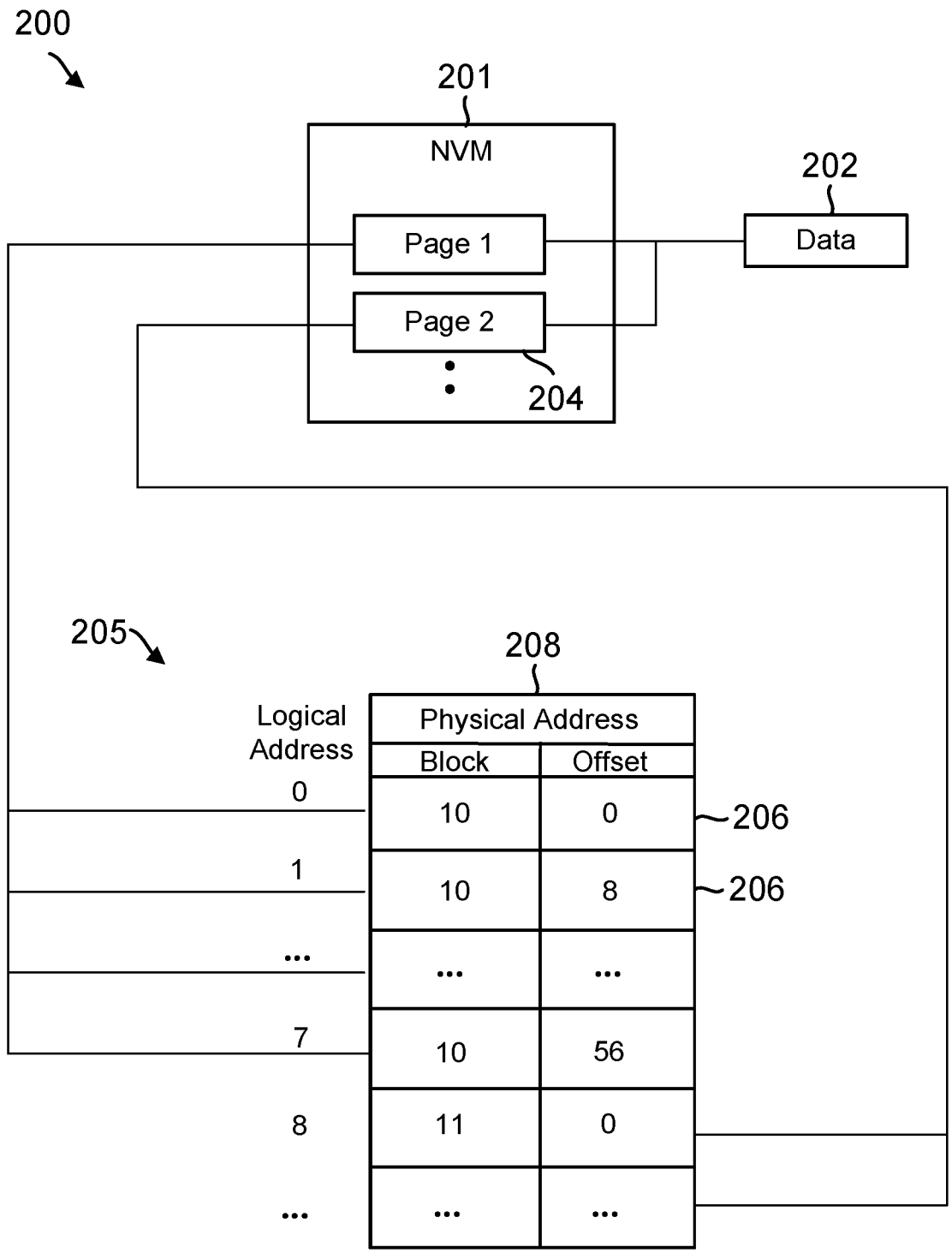
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 stored in volatile memory (e.g., the volatile memory 118 of FIG. 1) illustrating the mapping of data 202 received from a host device to logical addresses and physical addresses in NVM 201 (e.g., the NVM 110 of FIG. 1). The data 202 may correspond to the data 119 in FIG. 1, while the L2P mapping table 205 may correspond to the L2P mapping table 120 in FIG. 1. In one example, the data 202 may be stored in one or more pages 204 (e.g., physical pages) in NVM 201. Each page 204 may be associated with a mapping set including one or more entries 206 of the L2P mapping table 205 respectively identifying a physical address 208 mapped to a logical address (e.g., a logical block address (LBA)) associated with the data written to the NVM. A logical page may include one or more of the entries 206. An LBA may be a logical address specified in a write command for the data received from the host device. Physical address 208 may indicate the block and the offset at which the data associated with an LBA is physically written, as well as a length or size of the written data (e.g. 4 KB or some other size). In the illustrated example, page 204 encompassing 32 KB of data 202 may be associated with a mapping set including 8, 4 KB entries. However, in other examples, page 204 may encompass a different amount of host data (e.g. other than 32 KB of host data) or may include a different number of entries 206 (e.g., other than 8 entries), or entries 206 may respectively include different host data lengths (e.g., other than 4 KB each).

Referring back to FIG. 1, the NVM 110 includes sense amplifiers 124 and data latches 126 connected to each NVM memory location 112. For example, the NVM memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the NVM memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the NVM memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a system on a chip (SoC), a Field Programmable Gate Array (FPGA), hard-wired logic, analog circuitry and/or a combination thereof.

The controller 123 may be configured to receive data transferred from one or more of the cells 116 of the various NVM memory locations 112 in response to a read command. For example, the controller 123 may read the data 119 by activating the sense amplifiers 124 to sense the data from cells 116 into data latches 126, and the controller 123 may receive the data from the data latches 126. Alternatively, the controller may read data 119 from the NVM 110 according to any other manner known to one of ordinary skill in the art. The controller 123 also may be configured to program data into one or more of the cells 116 in response to a write command. For example, the controller 123 may write the data 119 by sending data to the data latches 126 to be programmed into the cells 116. Alternatively, the controller may write data 119 to the NVM 110 according to any other manner known to one of ordinary skill in the art. The controller 123 is further configured to access the L2P mapping table 120 in the volatile memory 118 when reading or writing data to the cells 116. For example, the controller 123 may receive logical-to-physical address mappings from the volatile memory 118 in response to read or write commands from the host device 104, identify the physical addresses mapped to the logical addresses identified in the commands (e.g. translate the logical addresses into physical addresses), and access or store data in the cells 116 located at the mapped physical addresses. The controller 123 is also configured to access an L2P mapping table in the NVM 110 (not shown), for example, following a power failure during initialization, to recover or populate the L2P mapping table 120 in the volatile memory 118.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a NVM memory location 112 in the NVM 110 of storage device 102 for storing the data. The controller 123 stores the L2P mapping in the L2P mapping table 120 to map a logical address associated with the data to the physical address of the NVM memory location 112 allocated for the data. The controller 123 then stores the data in the NVM memory location 112 by sending it to one or more data latches 126 connected to the allocated NVM memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the L2P mapping table 120 to translate the logical addresses specified in the read command to the physical addresses indicating the location of the data. The controller 123 then reads the requested data from the NVM memory location 112 specified by the physical addresses by sensing the data using the sense amplifiers 124 and storing them in data latches 126 until the read data is returned to the host 104 via the host interface 106.

The controller 123 may also maintain a key version (KV 128) in volatile memory 117 (or volatile memory 118) with which the controller encrypts and decrypts data 119 stored in the NVM 110, 201. When the controller 123 processes a write command including data 119 and indicating a logical page including one or more logical addresses or LBAs in which the data is to be written, the controller encrypts the data 119 using the KV 128, and writes the encrypted data in the NVM memory location 112 associated with that logical page including the KV 128 in metadata. The controller may also temporarily store the KV 128 as well as other data in volatile memory 117 or 118 (e.g., in cache or SRAM) before writing the encrypted data and metadata including the KV 128 to the NVM 110. When the controller processes a read command for the data 119 at the logical page, the controller may read encrypted data from the NVM memory location 112 and associated metadata including the KV 128, determine if the KV 128 maintained in volatile memory 117 or 118 matches the read KV, decrypt the data 119 using the read KV 128 if a KV match occurs, and return that read data to the host 104.

Figure 3:
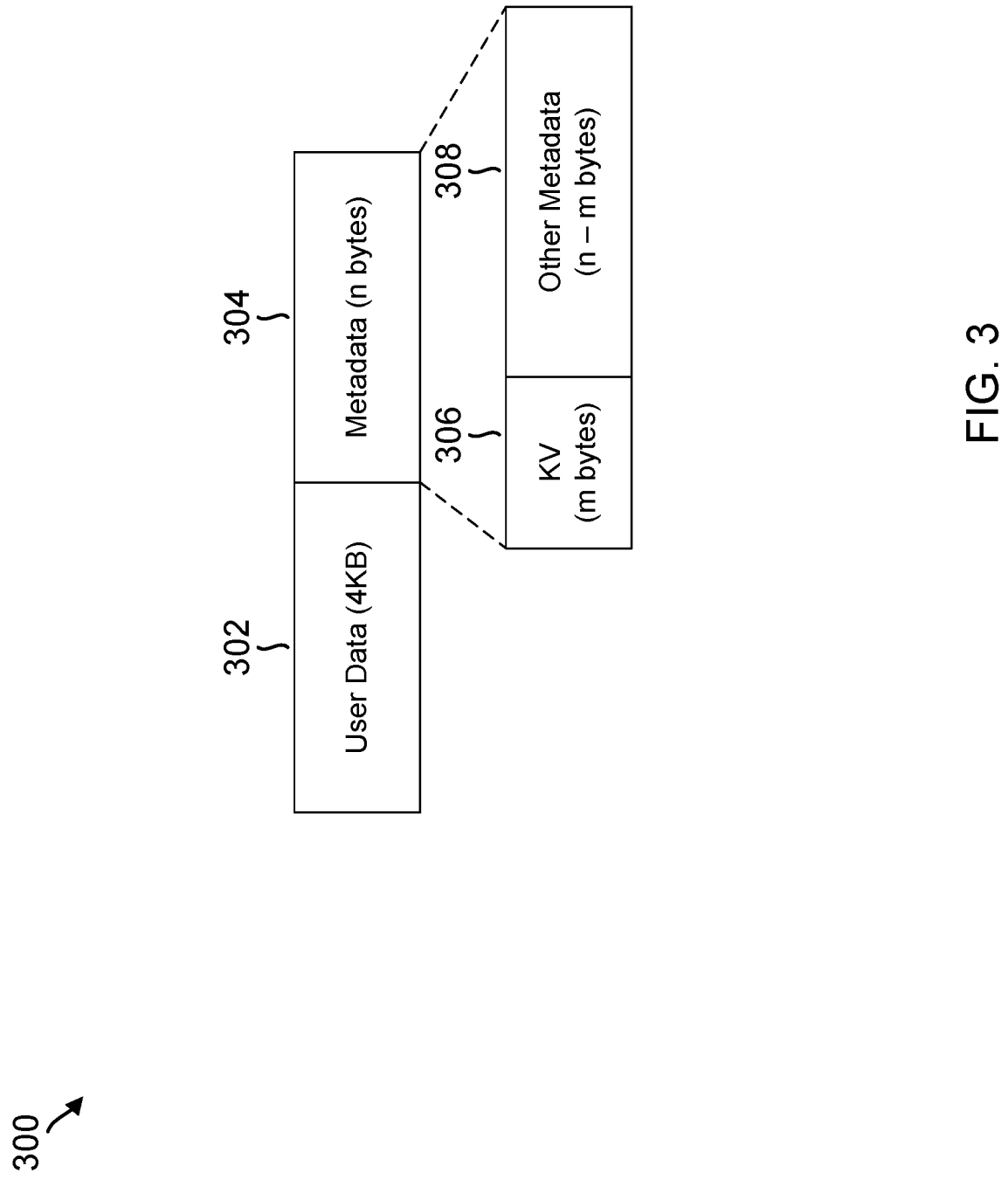
FIG. 3 is a conceptual diagram illustrating an example of a logical page including user data and metadata in an erase block of the storage device of FIG. 1.

FIG. 3 illustrates an example 300 of a logical page 302 including user data (e.g., data 119) and metadata 304. User data may include data received from host device 104 for a given application. Metadata 304 may include control data such as KV 128 in a KV field 306 and other parameters 308 that are not user data. While FIG. 3 specifically illustrates logical page 302 including 4 kB of user data, and n bytes of metadata including a KV field spanning m bytes and other metadata parameters in a different field spanning n–m bytes, it should be understood that this illustration is merely one example. In other examples, user data, metadata 304, or individual metadata fields in metadata 304 such as KV field 306 may have different lengths or sizes, individual metadata fields in metadata 304 may be arranged in different positions, and/or other parameters 308 may include more, less, or different information (as well as different quantities of fields) than those illustrated.

Referring back to FIG. 1, the controller 123 may in some cases receive a sanitize command 130 from the host device 104. For example, if the host device 104 determines to alter data 119 in the NVM 110, 201 such that recovery of previous user data is not possible, the host may send sanitize command 130 to controller 123 via host interface 106. Examples of sanitize commands include block erase sanitize operations (which alter user data with a block erase method), a cryptographic erase sanitize operation (which alter user data by changing media encryption keys), and an overwrite sanitize operation (which alter user data by writing a data pattern to media locations in which user data may be stored).

The controller 123 may further be configured to maintain a KV field offset 132 (e.g., a variable or value) in volatile memory 117 (or volatile memory 118) or in the NVM 110 of storage device 102. The controller 123 may be configured to update the value of this offset in response to receiving sanitize command 130 indicating a cryptographic erase. The controller 123 may also be configured to maintain (not change) the KV 128 in response to the sanitize command 130. For instance, in the case where the controller 123 receives sanitize command 130 indicating a cryptographic erase via host interface 106, the controller 123 may update the KV field offset 132 in the volatile memory 117 or 118 (or NVM 110) while maintaining the same KV itself (the KV is unchanged). For example, the controller may increment the KV field offset 132 by 1 (or by some other quantity) while leaving the KV as-is in response to a respective cryptographic erase, sanitize command.

The controller 123 may be configured to store the KV 128 used to encrypt data 119 in metadata beginning at the address indicated by the KV field offset 132. For instance, whenever the controller 123 receives a write command indicating logical page 302 from the host device 104 following a respective sanitize command and update of the KV field offset 132, the controller may store the KV 128 in the metadata 304 of logical page 302 beginning at a current address indicated by the updated KV field offset. For example, if the KV field offset 132 is currently '0', the controller 123 may store the KV 128 in metadata in KV field 306 such as illustrated in FIG. 3 (corresponding to address offset '0'), while if the KV field offset 132 is currently '1', the controller 123 may store the KV 128 in metadata beginning one byte (or other quantity) after the address of KV field 306 (corresponding to address offset '1').

Figure 4:
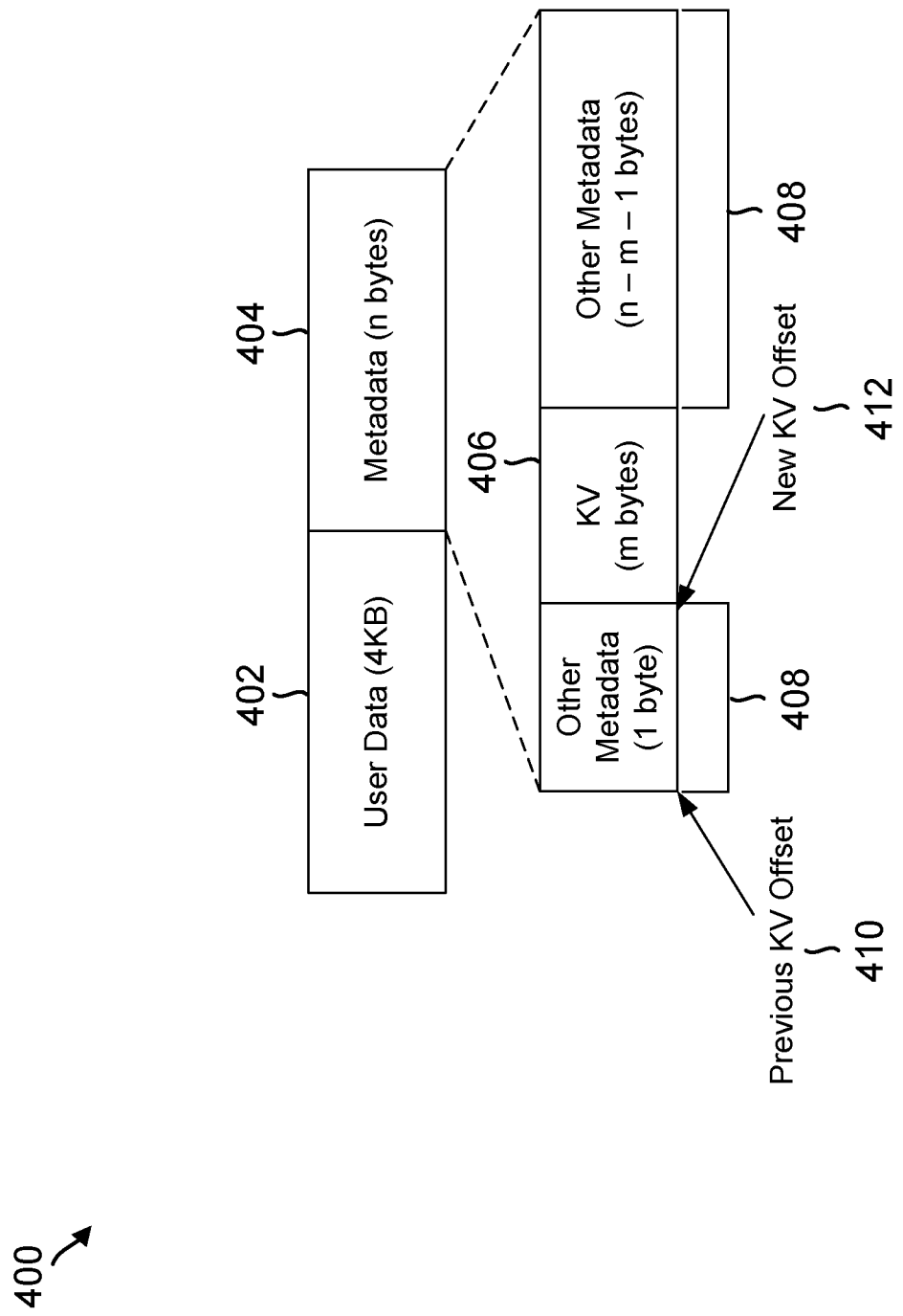
FIG. 4 is a conceptual diagram illustrating an example of a logical page including user data and metadata in an erase block of the storage device of FIG. 1 following reception of a sanitize command.

FIG. 4 illustrates an example 400 of a logical page 402 including user data (e.g., data 119) and metadata 404 following reception of sanitize command 130. Similar to example 300 of FIG. 3, user data in logical page 402 may include data received from host device 104 for a given application, and metadata 404 may include control data such as KV 128 in a KV field 406 and other parameters 408 that are not user data. Additionally, as is the case in example 300 of FIG. 3, the user data, metadata 404, or individual metadata fields in metadata 404 such as KV field 406 may have different lengths or sizes, individual metadata fields in metadata 404 may be arranged in different positions, and/or other parameters 408 may include more, less, or different information than those illustrated. However, unlike example 300 where in response to a respective write command prior to sanitize command 130, the controller 123 stores KV 128 in KV field 306 beginning at address offset ('0') corresponding to prior KV offset 410 in FIG. 4, in this example the controller 123 stores KV 128 in the metadata 404 beginning at new KV offset 412 corresponding to the updated value of KV field offset 132 responsive to sanitize command 130 (e.g., address offset '1'). Thus, the controller may effectively shift the position of KV field 406 with respect to KV field 306 by one byte (or by some other quantity in other examples) in response to one cryptographic erase, sanitize command. Alternatively, while the illustrated example refers to the KV field offset 132 being updated by 1 and the position of KV field 406 being correspondingly shifted by 1 byte in response to sanitize command 130, in other examples, the KV field offset 132 and/or the position of KV field 406 may be updated or shifted by different value(s) or quantities in response to sanitize command 130.

Moreover, the KV 128 stored at prior KV offset 410 (e.g., KV field 306 in logical page 302) is the same as the KV 128 stored at new KV offset 412 (e.g., KV field 406 in logical page 402). As a result, a logical page that is written prior to reception of sanitize command 130 may include the same KV 128 at a different offset than a logical page that is written after reception of sanitize command 130. If a same logical page that was written prior to reception of sanitize command 130 is overwritten after reception of sanitize command 130, the metadata 404 including the offset KV may be written to a new physical page mapped to this same logical page. Thus, different logical pages may have one single, same KV written respectively at different KV field offsets.

Furthermore, the address shifting for KV field 406 based on the value of KV field offset 132 does not affect the information stored in other parameters 408 of metadata 404 other than their positioning. For instance, if KV field 406 is shifted right by one byte as illustrated in FIG. 4 with respect to KV field 306 of FIG. 3, one or more of the other parameters 408 may be separated (segmented) to surround the shifted KV field or completely switch places with the shifted KV field. For example, one byte of the other parameters 408 field and the remaining n−m−1 bytes of the other parameters 408 field may surround the m byte, KV field 406 as illustrated in FIG. 4. In such case, the controller 123 may determine the location of the other, shifted metadata parameters based on the value of the KV field offset 132. For instance, the controller may determine in the example of FIG. 4 that the other parameters 408 have been segmented into 1 byte and n−m−1 bytes respectively when KV field offset 132 is 1, and thus the controller may successfully write respective bytes of the other parameters 408 in the segmented fields when writing metadata in response to a write command. For example, the controller may write one byte of control data at offset (e.g., byte) 0 of metadata 404, followed by the m bytes of KV 128 beginning at offset (e.g., byte) 1 of metadata 404, followed by the remaining n−m−1 bytes of the FTI beginning at the next offset (e.g., byte) of metadata 404. Similarly, the controller may successfully parse and concatenate the segmented fields when reading the metadata in response to a read command.

Referring back to FIG. 1, the controller 123 may be configured to distinguish between sanitized logical pages and non-sanitized (e.g., overwritten or re-written) logical pages using the KV field offset 132 in response to a read command for a given logical page (e.g., logical page 402). For instance, the controller 123 may read an expected KV from the metadata 404 associated with logical page 402 beginning at an address corresponding to the current value of the KV field offset 132 (e.g., in KV field 406 beginning at new KV offset 412), and determine whether the expected KV is the same as (matches) the KV 128 maintained in volatile memory 117 or 118 (or in the NVM 110 depending on the controller's configuration). If a match is determined, the controller 123 may determine that a successful read has occurred for a non-sanitized logical page, and accordingly decrypt the user data in the logical page 402 using the expected KV to obtain the host data and provide the host data to the host device 104. On the other hand, if a match is not determined (the KV 128 mismatches or is not the same as the expected KV read from the metadata 404 at new KV offset 412), the controller may repeat the aforementioned process of reading an expected KV and determining whether a KV match or mismatch exists using the prior value of the KV field offset 132. For instance, the controller 123 may read another expected KV from the metadata 404 associated with logical page 402 but this time beginning at an address corresponding to the prior value of the KV field offset 132 (e.g., in KV field 406 beginning at prior KV offset 410, since offset '0' is immediately prior to current offset '1'), and the controller may similarly determine whether this expected KV is the same as (matches) the KV 128 maintained in volatile memory 117 or 118 or in NVM 110. If a match this time is determined, the controller 123 may determine that a successful read has occurred for a sanitized logical page, and accordingly decrypt the user data in the logical page 402 using a different KV than the expected KV to obtain garbage data and provide this garbage data to the host device 104. However, if a KV mismatch again occurs (the KV 128 is not the same as the expected KV read from the metadata 404 at prior KV offset 410), the controller 123 may determine that a bit error or other device error has occurred in writing or reading the KV 128 at either offset, and so the controller may determine that a failed read has occurred for the logical page and accordingly return an error message to the host device 104.

As an example, assume that the controller 123 receives write commands to respectively write data to logical pages A and B (e.g., logical pages 302) using KV1 and writes KV1 itself at KV field offset '0' (e.g., in KV field 306), and then the controller 123 receives sanitize command 130 to change its associated KV field offset 132 from '0' to '1' and shift the KV field right by one byte. Assume further in this example that the controller 123 receives, following the sanitize command 130, another write command to overwrite data in logical page B (e.g., logical page 402) again using KV1 but this time writing KV1 at KV field offset '1' (e.g., in KV field 406), and then the controller afterwards receives a read command for logical pages A and B respectively.

In the case of sanitized, logical page A, the controller 123 may initially read the metadata 404 for an expected KV beginning at offset '1' of logical page A (e.g., at new KV offset 412), but since KV1 is actually stored beginning at offset '0', the controller may determine that the expected KV read from the metadata does not match KV1. For example, the expected KV read at offset '1' may in actuality include one portion of KV1 bits and another portion of other metadata bits, or bits from some other parameter 408 in the metadata 404, and thus not be the same as KV1. As a result, the controller may subsequently read the metadata 404 for another expected KV now beginning at prior offset '0' of logical page A (e.g., at prior KV offset 410), and since KV1 is indeed stored beginning at offset '0', the controller may determine that the expected KV read from the metadata does indeed match KV1. As a result, the controller may determine that logical page A is a sanitized logical page, and therefore proceed to decrypt the data in logical page A using a different KV (e.g., the mismatched KV read at offset '1' or a random KV) to arrive at garbage data and return the garbage data resulting from the decryption to the host for logical page A.

In the case of non-sanitized, logical page B, the controller 123 may initially read the metadata 404 for an expected KV beginning at offset '1' of logical page A (e.g., at new KV offset 412), but ends up misreading the stored key version in the metadata as KVx due to a bit flip or other device error. In such case, the controller may determine that the expected KV misread from the metadata at offset '1' (as KVx) is not the same as KV1. As a result, the controller may subsequently read the metadata 404 for another expected KV now beginning at prior offset '0' of logical page A (e.g., at prior KV offset 410), but since KV1 was actually stored beginning at offset '1' but just misread due to a device error, the controller may determine that the expected KV read from the metadata at offset '0' again does not match KV1. As a result, the controller may determine that a read error occurred for logical page B, and therefore proceed to fail the read command and return an error message to the host for logical page B.

While the above example specifically relates to distinguishing sanitized and non-sanitized logical pages following a single sanitize command, the controller 123 may similarly be configured to perform such distinctions when multiple sanitize commands are received between intervening write commands. More particularly, each time the controller 123 receives sanitize command 130 from the host device 104 indicating a cryptographic erase, the controller 123 may be configured to update the KV field offset 132 (again without changing the KV 128). For example, if the controller 123 receives two sanitize commands, the controller may update the KV field offset from '0' to '1' (or other value) in response to the first sanitize command and afterwards again from '1' to '2' (or other value) in response to the second sanitize command. Similarly, whenever the controller receives a write command to write data to a logical page following a respective sanitize command, then when the controller writes the data to a new physical page in the NVM 110, 201, the controller 123 may also be configured to store the KV 128 in the metadata 404 associated with that logical page 402 beginning at the updated address offset corresponding to the updated KV field offset 132. For example, after the first sanitize command is received (when KV field offset 132 is '1'), the controller may write the KV 128 in metadata beginning at offset '1' (or other value) for each write command that is received, while after the second sanitize command is received (when KV field offset 132 is now '2'), the controller may write the KV 128 in metadata beginning at offset '2' (or other value) for each write command that is received. As a result, the KV field 306 in the metadata 304 of logical pages written after the first sanitize command may effectively be shifted by one byte (or other quantity) as shown by KV field 406 in FIG. 4 when the KV field offset is updated to '1' (or other value), while the KV field in the metadata of logical pages written after the second sanitize command may effectively be shifted by two bytes (or other quantity) when the KV field offset is updated to '2' (or other value).

Therefore, after sending two sanitize commands in one example, the host may send read commands to the storage device 102 for sanitized logical pages written prior to the first sanitize command (with KV 128 at offset '0'), for sanitized logical pages written prior to the second sanitize command (with KV 128 at offset '1'), and for non-sanitized logical pages written after the second sanitize command (with KV 128 at current offset '2'). In response to a respective read command for one of these logical pages, the controller may determine whether the logical page is sanitized or not using the same KV comparison process as that described above for a single sanitize command. For example, as with a single sanitize command, the controller may similarly read an expected KV at a current KV field offset, determine whether a KV match or mismatch exists at the current KV field offset, read another expected KV at a prior KV field offset if a KV mismatch occurs, determine whether a KV match or mismatch exists at the prior KV field offset, and conclude whether the logical page is sanitized or whether a device error occurred depending on whether a KV match or mismatch exists at the prior KV field offset. However, instead of performing these reading and determining process steps (KV comparisons) at most twice as in the case of a single sanitize command (e.g., in two iterations, once for the current KV field offset and once for the prior KV field offset), here when a read is requested for a sanitized logical page or if a device error occurs in writing or reading the KV, the controller 123 here may continue performing KV comparisons at most up to three times in the case of two sanitize commands (e.g., in three iterations, once for the current KV field offset, once for the prior KV field offset, and once for the KV field offset before the prior KV field offset). In contrast, when a read is requested for a non-sanitized logical page without device error occurrence, improved read performance may still be achieved even in the case of multiple sanitize commands, since the controller 123 performs only a single KV comparison as a result of the KV comparison succeeding at the current KV field offset.

Thus, in one example, the controller may be configured to update the KV field offset and shift the KV field in metadata at most once for one sanitize command (e.g., from '0' to '1' with a one byte shift), at most twice for two sanitize commands (e.g., from '0' incrementally to '2' with two, one byte shifts), and in general up to k times for k sanitize commands (e.g., from '0' incrementally to k with k, one byte shifts). For instance, if six sanitize commands are received (k=6), the controller may shift the KV field in metadata by six bytes with respect to the KV field 306 in FIG. 3, while if ten sanitize commands are received (k=10), the controller may shift the KV field in metadata by ten bytes with respect to the KV field 306 in FIG. 3.

Similarly, when distinguishing sanitized and non-sanitized commands in response to a read command using one or more KV comparisons, the controller 123 may be configured to apply the aforementioned reading and determining process (the KV comparisons) at most twice for one sanitize command, at most three times for two sanitize commands, and in general up to k+1 times for k sanitize commands. If a KV match is determined during any of these up to k+1 iterations, the controller may conclude the logical page is sanitized and stop the reading and determining process. If a KV mismatch is determined during a respective iteration, the controller may repeat the reading and determining process for the prior KV field offset, and continue in like manner until no further prior KV field offsets exist. In the event a KV mismatch is determined during every iteration, the controller may conclude a device error has occurred and stop the reading and determining process. For instance, if six sanitize commands are received (k=6), the controller may perform up to 7 KV comparisons (e.g., one at current offset '6', one at prior offset '5', one at further prior offset '4', one at further prior offset '3', one at further prior offset '2', one at further prior offset '1', and one at last, further prior offset '0'). Similarly, if ten sanitize commands are received (k=10), the controller may perform up to 11 KV comparisons or iterations, stopping the process early before all iterations are performed if a KV match is determined during one iteration (in which case the logical page is determined to be a sanitized command), or alternatively stopping the process after all iterations are performed if a KV mismatch is determined during every iteration.

As an example, assume that the controller 123 receives write commands to respectively write data to logical pages A, B, and C (e.g., logical pages 302) using KV1 and writes KV1 itself at KV field offset '0' (e.g., in KV field 306), and then the controller 123 receives sanitize command 130 to change its associated KV field offset 132 from '0' to '1' and shift the KV field right by one byte. Assume further in this example that the controller 123 receives, following the sanitize command 130, another write command to overwrite data in logical page B (e.g., logical page 402) again using KV1 but this time writing KV1 at KV field offset '1' (e.g., in KV field 406), and then the controller 123 receives sanitize command 130 again to change its associated KV field offset 132 from '1' to '2' and shift the KV field right again by one byte. Finally, assume additionally in this example that the controller 123 receives, following the second sanitize command, a further write command to overwrite data in logical page C again using KV1 but this time writing KV1 at KV field offset '2', and the controller afterwards receives a read command for logical pages A, B, and C respectively.

In the case of sanitized, logical page A, the controller 123 may initially read the metadata for an expected KV beginning at offset '2' of logical page A, but since KV1 is actually stored beginning at offset '0', the controller may determine that the expected KV read from the metadata does not match KV1. As a result, the controller may subsequently read the metadata for another expected KV now beginning at prior offset '1' of logical page A, in which case again the controller may determine that the expected KV read from the metadata does not match KV1 since KV1 is again stored beginning at offset '0'. As a result, the controller may subsequently read the metadata for a further expected KV now beginning at prior offset '0' of logical page A, and since KV1 is indeed stored beginning at offset '0', the controller may determine that the expected KV read from the metadata does indeed match KV1. As a result, the controller may determine that logical page A is a sanitized logical page, and therefore proceed to decrypt the data in logical page A using a different KV (e.g., the mismatched KV read at offset '1' or '2' or a random KV) to arrive at garbage data and return the garbage data resulting from the decryption to the host for logical page A.

Similarly, in the case of sanitized, logical page B, the controller 123 may initially read the metadata for an expected KV beginning at offset '2' of logical page B, but since KV1 is actually stored beginning at offset '1', the controller may determine that the expected KV read from the metadata does not match KV1. As a result, the controller may subsequently read the metadata for another expected KV now beginning at prior offset '1' of logical page B, and since KV1 is indeed stored beginning at offset '1', the controller may determine that the expected KV read from the metadata does indeed match KV1. As a result, the controller may determine that logical page B is a sanitized logical page, and therefore proceed to decrypt the data in logical page B using a different KV (e.g., the mismatched KV read at offset '2' or a random KV) to arrive at garbage data and return the garbage data resulting from the decryption to the host for logical page B.

In the case of non-sanitized, logical page C, the controller 123 may initially read the metadata for an expected KV beginning at offset '2' of logical page C, but ends up misreading the stored key version in the metadata as KVx due to a bit flip or other device error. In such case, the controller may determine that the expected KV misread from the metadata at offset '2' (as KVx) is not the same as KV1. As a result, the controller may subsequently read the metadata for another expected KV now beginning at prior offset '1' of logical page C, but since KV1 was actually stored beginning at offset '2' but just misread due to a device error, the controller may determine that the expected KV read from the metadata at offset '1' again does not match KV1. Similarly, the controller may repeat the process at offset '0' and again determine that the expected KV read from the metadata at offset '0' does not match KV1. As a result, the controller may determine that a read error occurred for logical page C, and therefore proceed to fail the read command and return an error message to the host for logical page C.

Figure 5:
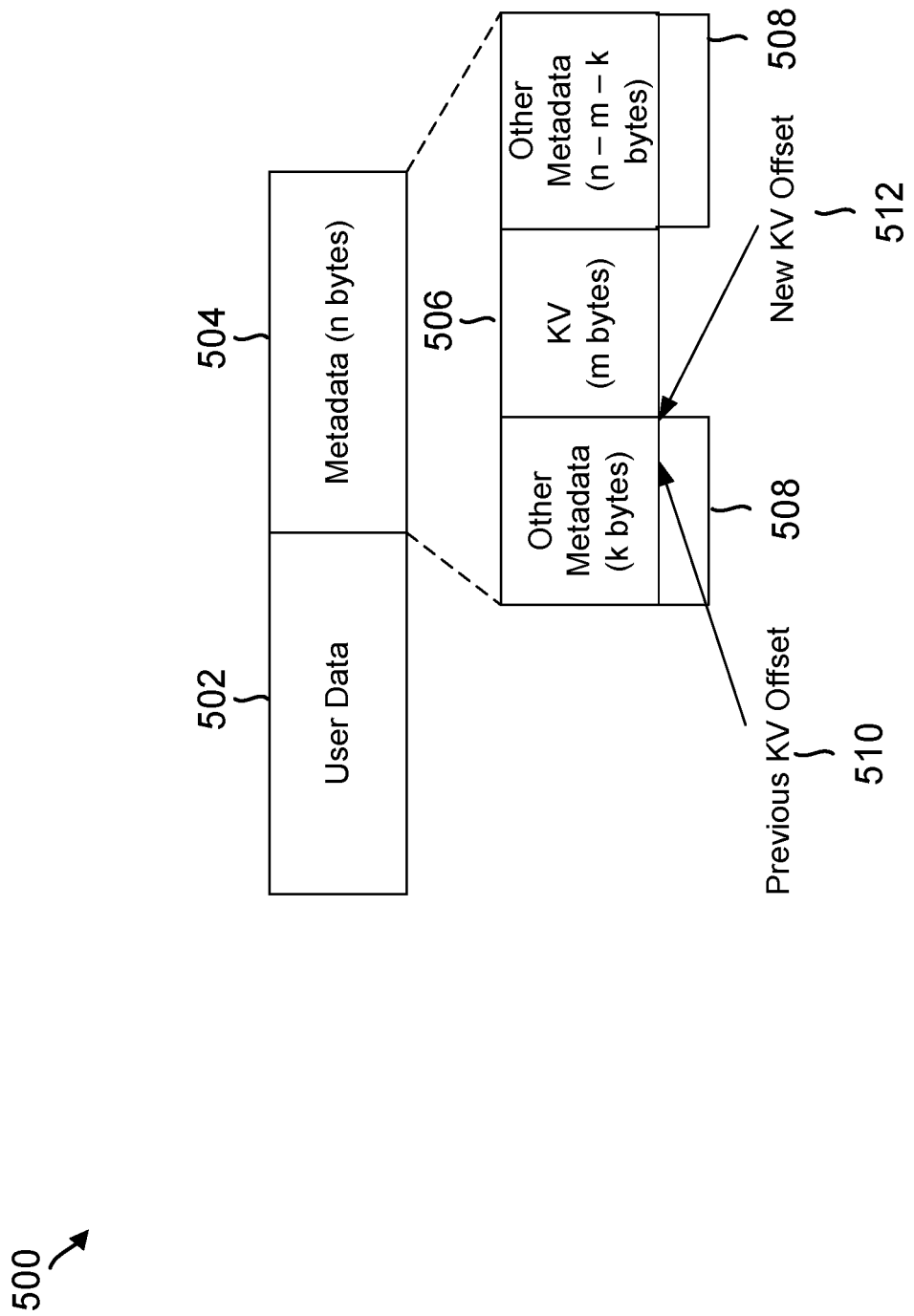
FIG. 5 is a conceptual diagram illustrating an example of a logical page including user data and metadata in an erase block of the storage device of FIG. 1 following reception of a plurality of sanitize commands.

FIG. 5 illustrates an example 500 of a logical page 502 including user data (e.g., data 119) and metadata 504 following reception of k sanitize commands. Similar to example 400 of FIG. 4, user data in logical page 502 may include data received from host device 104 for a given application, and metadata 504 may include control data such as KV 128 in a KV field 506 and other parameters 508 that are not user data. Additionally, as is the case in example 400 of FIG. 4, the user data, metadata 504, or individual metadata fields in metadata 504 such as KV field 506 may have different lengths or sizes, individual metadata fields in metadata 504 may be arranged in different positions, and/or other parameters 508 may include more, less, or different information than those illustrated. Similarly, the quantity of bytes that KV field 506 may shift in response to a single sanitize command, as well as the update in value of KV field offset 132 responsive to a single sanitize command, may be different in different examples. However, unlike example 400 where a single sanitize command is received and therefore the KV field 406 is shifted by one byte with respect to KV field 306 of FIG. 3, in this example k sanitize commands are received and therefore the controller 123 shifts the KV field 506 by k bytes with respect to KV field 306 of FIG. 3. For instance, each sanitize command may result in an offset or shift of one byte, and therefore by the time k sanitize commands have been received and KV field offset 132 has accordingly been updated with a value of 'k', prior KV offset 510 may correspond to offset 'k−1' while new KV offset 512 may correspond to offset 'k'. Moreover, as was the case in FIG. 4, the KV 128 stored at prior KV offset 510 (and further prior offsets) is the same as the KV 128 stored at new KV offset 512 (e.g., KV field 506 in logical page 502). Furthermore, the address shifting for KV field 506 based on the value of KV field offset 132 does not affect the information stored in other parameters 508 of metadata 504 other than their positioning. For instance, if KV field 506 is shifted right by k bytes as illustrated in FIG. 5 with respect to KV field 306 of FIG. 3, one or more of the other parameters 508 may switch places with the shifted KV field.

Figure 6:
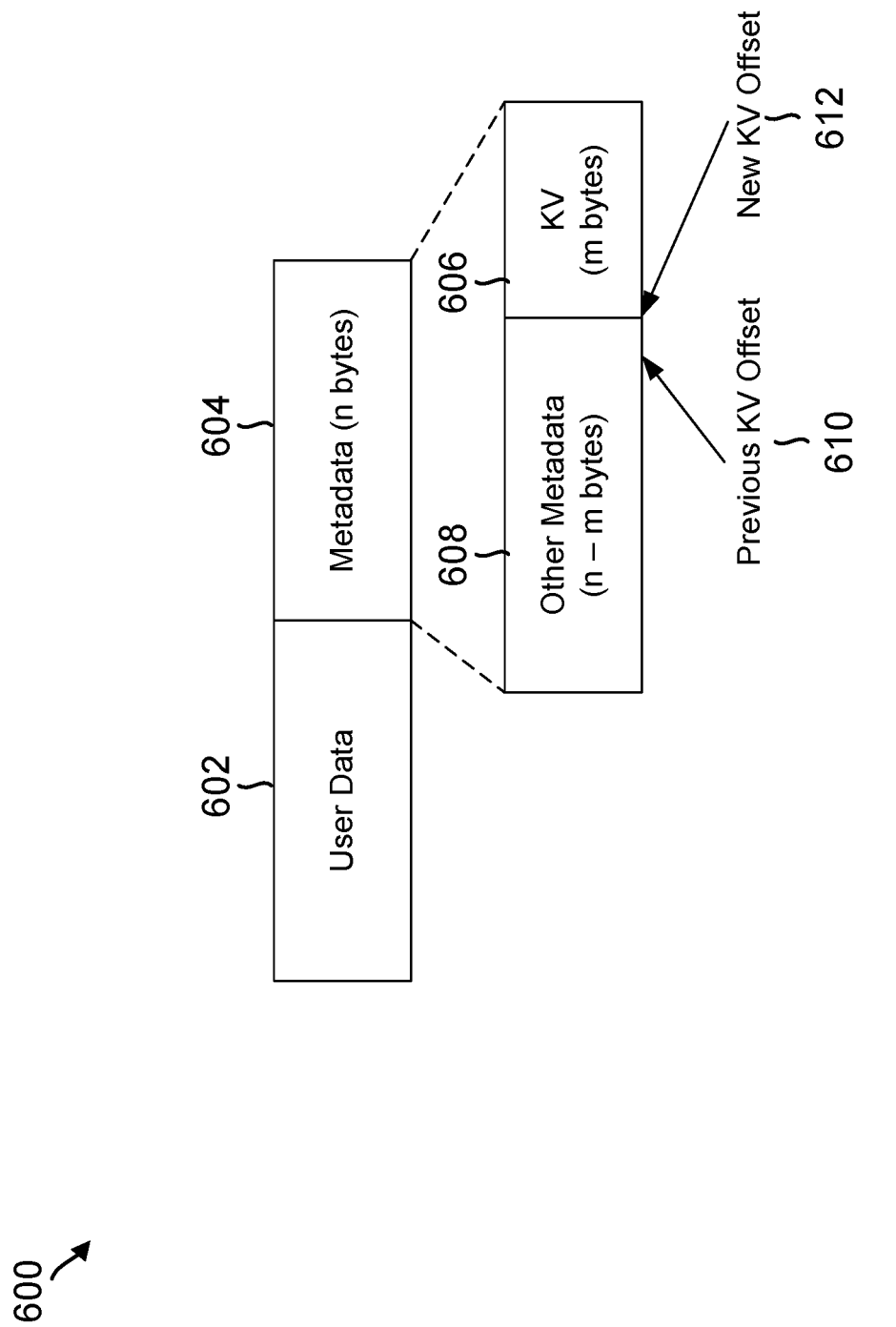
FIG. 6 is a conceptual diagram illustrating an example of a logical page including user data and metadata in an erase block of the storage device of FIG. 1 following reception of a different plurality of sanitize commands.

FIG. 6 illustrates an example 600 of a logical page 602 including user data (e.g., data 119) and metadata 604 following reception of k=n−m sanitize commands. Similar to example 400 of FIG. 4, user data in logical page 602 may include data received from host device 104 for a given application, and metadata 604 may include control data such as KV 128 in a KV field 606 and other parameters 608 that are not user data. Additionally, as is the case in example 400 of FIG. 4, the user data, metadata 604, or individual metadata fields in metadata 604 such as KV field 606 may have different lengths or sizes, individual metadata fields in metadata 604 may be arranged in different positions, and/or other parameters 608 may include more, less, or different information than those illustrated. Similarly, the quantity of bytes that KV field 606 may shift in response to a single sanitize command, as well as the update in value of KV field offset 132 responsive to a single sanitize command, may be different in different examples. However, unlike example 400 where a single sanitize command is received and therefore the KV field 406 is shifted by one byte with respect to KV field 306 of FIG. 3, in this example n–m sanitize commands are received and therefore the controller 123 shifts the KV field 606 by n–m bytes with respect to KV field 306 of FIG. 3. For instance, each sanitize command may result in an offset or shift of one byte, and therefore by the time n–m sanitize commands have been received and KV field offset 132 has accordingly been updated with a value of 'n–m, prior KV offset 610 may correspond to offset 'n–m–1' while new KV offset 612 may correspond to offset 'n–m. Moreover, as was the case in FIG. 4, the KV 128 stored at prior KV offset 610 (and further prior offsets) is the same as the KV 128 stored at new KV offset 612 (e.g., KV field 606 in logical page 602). Furthermore, the address shifting for KV field 606 based on the value of KV field offset 132 does not affect the information stored in other parameters 608 of metadata 604 other than their positioning. For instance, if KV field 606 is shifted right by n–m bytes as illustrated in FIG. 6 with respect to KV field 306 of FIG. 3, one or more of the other parameters 608 may switch places with the shifted KV field. For example, all n–m bytes combined of the other parameter 608 fields may switch places with the m bytes of the KV field as illustrated in FIG. 6.

Referring back to FIG. 1, the controller 123 may be configured to perform, in response to respective sanitize commands 130, a maximum number of updates to KV field offset 132 or shifts to KV field 306, 406, 506, 606. This maximum quantity of sanitize commands 130, or the value of k which the controller may perform, is dependent on the length or size of the KV 128 (or KV field 306, 406, 506, 606) as well as the length or size of the metadata 304, 404, 504, 604 (its total size). For example, if the KV field 306, 406, 506, 606 is m bytes in length while metadata 304, 404, 504, 604 is n bytes in length, then the controller may perform up to n–m, incremental KV field offset updates or one-byte shifts of the KV field in the metadata (thereby arriving at the illustrated example of FIG. 6). The controller may not perform further offset updates than n–m in this example since the KV field 606 is at the end of the metadata 604, and thus any further one-byte shifts would lead to the KV field circling back to the beginning of the metadata and possibly interfering with the ability of the controller to distinguish non-sanitized commands having KV stored at offset 0 with sanitized commands having KV circled back to be stored at offset 0 (in actuality offset n–m+1). Thus, if the host sends the controller a sanitize command that exceeds this maximum quantity of sanitize commands, the controller may fail the command and inform the host device of this sanitize failure. In response to the sanitize failure, the host may refrain from sending further sanitize commands until a format command has been sent to the storage device to reset the system. Thus, in this example the controller may expect to receive a format command from the host device after receiving a maximum quantity of sanitize commands 130 the controller may perform (e.g., k=n–m), although this quantity may again be different in other examples depending on the size of the KV field, the metadata length, the quantity of bytes that the KV field may shift in response to a single sanitize command, and the change in value of KV field offset 132 responsive to a single sanitize command. For example, the host may send the controller a format command after sending 5, 10, or other number of sanitize commands.

As previously mentioned, while the above examples refer to the KV field 306, 406, 506, 606 being shifted incrementally by one byte in response to respective sanitize commands, the number of shifted bit(s) or byte(s) per sanitize command may be different in other examples depending on the total length or size of metadata 304, 404, 504, 604, the size of KV 128, and/or other device factors. For example, instead of increasing the value of KV field offset 132 by one and correspondingly shifting the KV field 306, 406, 506, 606 in metadata 304, 404, 504, 604 by one byte in response to a respective sanitize command, the controller may alternatively be configured to increase the value of the KV field offset by two and correspondingly shift the KV field in metadata by two bytes after each sanitize command, subject again to the total size of the metadata and/or the number of sanitize commands the controller may support. For instance, if in the example of FIG. 6 k=n–m=10 such that the controller may shift KV field 606 by one byte for each sanitize command up to ten times, in other examples the controller may shift the KV field by two bytes for each sanitize command up to five times, by three bytes for each sanitize command up to three times, or the like (such that the KV field does not end up circularly shifting back to the beginning of the metadata). Additionally, while the above examples refer to byte-wise shifting (e.g., one byte, two bytes, three bytes, etc.), in other examples, the KV field could be shifted bit-wise instead (e.g., four bits, etc.), where again the granularity (e.g., the number of bits or bytes) per KV field shift may be dependent on the aforementioned factors.

Figure 7:
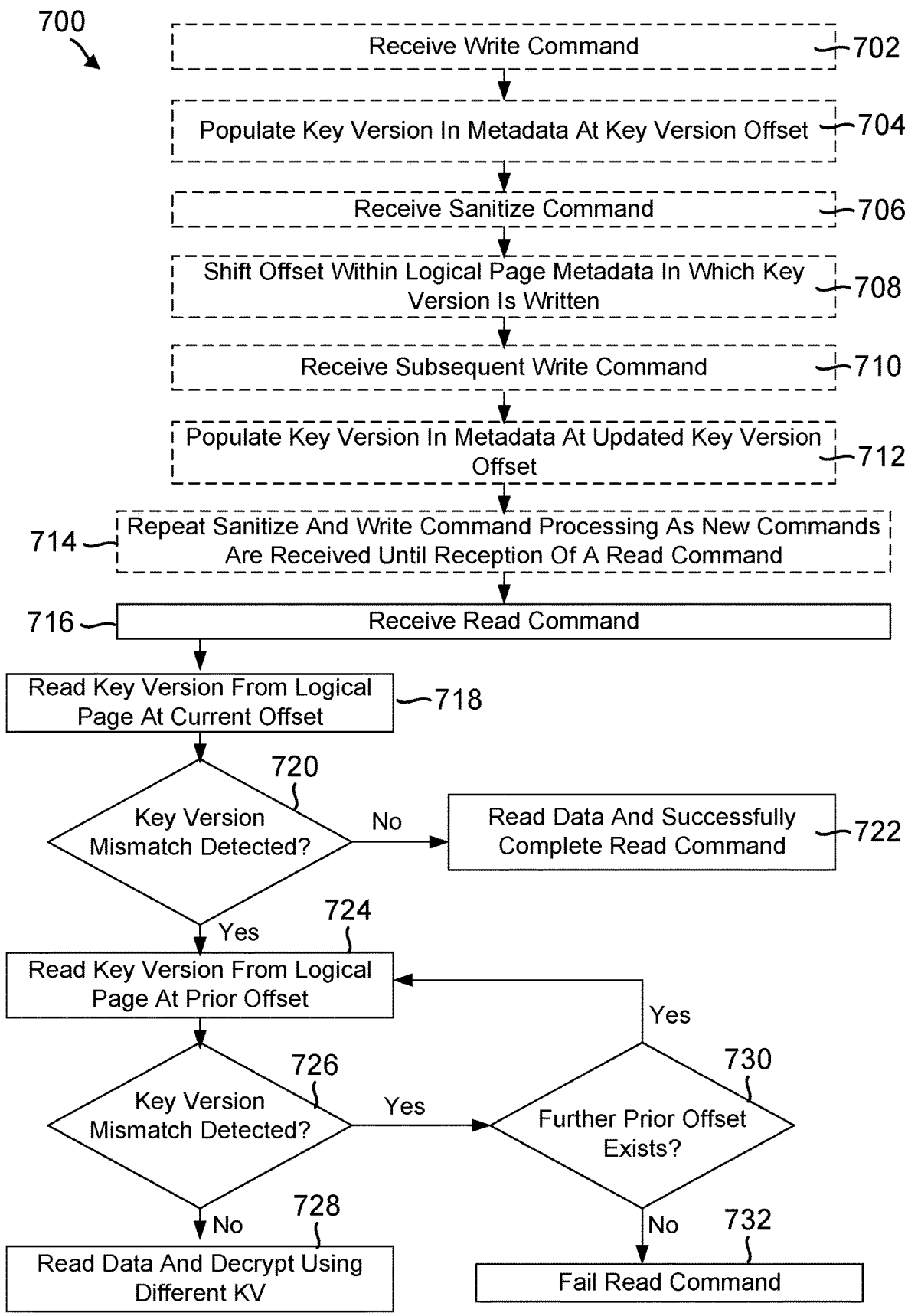
FIG. 7 is a flow chart illustrating an example of a method of managing a key version and processing host commands associated with sanitized and non-sanitized logical pages, as performed by the storage device of FIG. 1.

FIG. 7 illustrates an example flow chart 700 of a method of managing a key version and processing host commands associated with sanitized and non-sanitized logical pages in a storage device. For example, the method can be carried out in a storage device 102 such as the one illustrated in FIG. 1. Each of the steps in the flow chart can be controlled using the controller as described below (e.g. controller 123), by a component or module of the controller (e.g., a SPE), or by some other suitable means. Optional aspects are illustrated in dashed lines.

At block 702, the controller may receive a write command from a host device. For instance, the controller 123 may receive a command to write data 119 in a logical page 302 indicated in the write command. In response to the write command, the controller may encrypt the data 119 using KV 128, write the encrypted data in a physical page in one of the NVM memory locations 112, and update the L2P mapping table 120, 205 to associate the written physical page with the logical page 302.

At block 704, the controller may populate a key version in metadata at a key version offset. For instance, in response to the write command at block 702, the controller 123 may store KV 128 in metadata 304 of the logical page 302 in KV field 306 at the offset indicated by KV field offset 132. Initially, the KV field offset may be '0', so the controller may store the KV in the metadata at offset '0' such as illustrated in FIG. 3.

At block 706, the controller may receive a sanitize command. For instance, the controller 123 may receive sanitize command 130 from the host device 104. In response to the sanitize command 130 indicating a cryptographic erase, the controller 123 may update the KV field offset 132 (e.g., from '0' to '1') while maintaining the same KV 128 in volatile memory 117 or 118 (or NVM 110).

At block 708, the controller may shift an offset within logical page metadata in which the key version is written. For instance, in response to updating KV field offset 132 from '0' to '1', the controller may shift the address offset of the KV field 306 in metadata 304 of the logical page 302 by one byte to arrive at the position of KV field 406 in metadata 404 of logical page 402.

At block 710, the controller may receive a subsequent write command from the host device. For instance, the controller 123 may receive another command to write data 119 in the logical page 402 which may be a different logical page than or a same logical page as that indicated in the write command at block 702. In response to the subsequent write command, the controller may similarly encrypt the data 119 using KV 128, write the encrypted data in a physical page in one of the NVM memory locations 112, and update the L2P mapping table 120, 205 to associate the written physical page with the logical page 402.

At block 712, the controller may populate the key version in metadata at the updated key version offset. For instance, in response to the subsequent write command at block 710, the controller 123 may store KV 128 in metadata 404 of logical page 402 in KV field 406 at the offset indicated by KV field offset 132. Currently following receipt of the sanitize command at block 706, the KV field offset is '1', so the controller may store the KV in the metadata at offset '1' such as illustrated in FIG. 4.

At block 714, the controller 123 may repeat the operations performed at blocks 706, 708, 710, and 712 as the host device 104 sends additional sanitize commands and write commands until a read command is received. In response to each sanitize command received at block 706 indicating a cryptographic erase, the controller may update the KV field offset 132 and correspondingly shift the address offset of the KV field in the metadata at block 708. Similarly in response to each subsequent write command received at block 710, the controller may encrypt and store the data 119 using the KV 128 and store the KV in the shifted KV field at the updated address offset at block 712. This process may continue for up to k sanitize commands, resulting in the current offset being as illustrated for example in FIG. 5 when k<n–m or as illustrated for example in FIG. 6 when k=n–m.

At block 716, the controller may receive a read command from the host device. For instance, the controller 123 may receive a command to read data 119 from the logical page 302 written at block 702, the logical page 402 written at block 710, or the logical page 502, 602 written at block 714. When processing the read command, the controller may determine from the L2P mapping table 120, 205 the physical page in the NVM 110 mapped to the logical page 302, 402, 502, 602 indicated in the read command, and the controller may read the encrypted data and metadata 304, 404, 504, 604 previously written in the determined physical page.

At block 718, in response to the read command, the controller may read an expected key version from the logical page at a current offset in the associated metadata. For instance, the controller 123 may read an expected KV from the KV field 306, 406, 506, 606 in metadata 304, 404, 504, 604 of logical page 302, 402, 502, 602 at the metadata address corresponding to the current value of KV field offset 132 (e.g., at the address offset indicated by new KV offset 412, 512, 612).

At block 720, the controller may determine whether a KV mismatch is detected. For instance, the controller may compare the expected KV read from the metadata 304, 404, 504, 604 at the current offset with the KV 128 maintained in volatile memory 117 or 118 (or in the NVM 110). If the expected KV matches the KV (e.g., if the KV 128 is stored at the current address offset indicated by new KV offset 412, 512, 612 and thus the logical page 302, 402, 502, 602 is a non-sanitized logical page), then at block 722, the controller may read the data 119 from the logical page, decrypt the data using the KV 128, and successfully complete the read command.

Alternatively, if the expected KV does not match the KV (e.g., if the logical page was written before reception of sanitize command 130), then at block 724, the controller may read an expected key version from the logical page at a prior offset in the associated metadata. For instance, the controller 123 may read an expected KV from the KV field 306, 406, 506, 606 in metadata 304, 404, 504, 604 of logical page 302, 402, 502, 602 at the metadata address corresponding to the immediate prior value of KV field offset 132 (e.g., at the address offset indicated by prior KV offset 410, 510, 610).

Then at block 726, the controller may determine whether a KV mismatch is detected. For instance, the controller may compare the expected KV read from the metadata 304, 404, 504, 604 at the prior offset with the KV 128 maintained in volatile memory 117 or 118 (or in NVM 110). If the expected KV matches the KV (e.g., if the KV 128 is stored at the prior address offset indicated by prior KV offset 410, 510, 610 and thus the logical page 302, 402, 502, 602 is a sanitized logical page), then at block 728, the controller may read the data 119 from the logical page, decrypt the data using the a different KV than KV 128 to arrive at garbage data, and return the garbage data to the host device in completion of the read command.

Alternatively, if the expected KV does not match the KV, then at block 730, the controller may determine whether a further prior offset exists for the KV field (e.g., whether the number of compared offsets is less than the number of received sanitized commands). For example, the controller may determine at block 730 whether the prior KV offset that the controller recently considered corresponds to a value of KV field offset 132 that is currently equal to 0 (e.g., prior KV offset 410 in FIG. 4 which corresponds to an offset '0'). If no further prior offset exists at this time (indicating that a single sanitize command was received from the host device before the read command), the controller may conclude that the KV mismatches were due to a device error, and thus at block 732, the controller may fail the read command and consequently return a fixed pattern of data other than data 119 to the host.

In contrast, if the controller determines at block 730 that a further prior offset does exist, the controller may determine that multiple sanitize commands were received from the host device before the read command. For example, the controller may determine at block 730 whether the prior KV offset that the controller recently considered corresponds to a value of KV field offset 132 that is currently greater than 0 (e.g., prior KV offset 510 in FIG. 5 which corresponds to an offset 'k–1' or prior KV offset 610 in FIG. 6 which corresponds to an offset 'n–m–1'), indicating that multiple sanitize commands rather than a single sanitize command have been received. In such case, the controller may repeat the operations beginning at block 724 for the next, immediate prior offset (e.g., at immediately prior offset 'k–2' in the example of FIG. 5 or prior offset 'n–m–2' in the example of FIG. 6). The controller may continue in like manner until either a match between KV 128 and an expected KV at a prior offset is determined at block 726, in which case the controller performs block 728 as previously described, or until no further prior offset exists as determined at block 730 (e.g., the number of compared offsets equals the number of received sanitized commands), in which case the controller performs block 732 as previously described. For example, in the case k=6 in the example of FIG. 5, after determining a KV mismatch at block 722 for current offset '6' and another KV mismatch at block 726 for prior offset '5', the controller may repeat the operations beginning at block 724 for prior offset '4', then if a KV mismatch is determined, again repeat for prior offset '3', and continue so forth, until either a KV match is determined at any offset (in which case the repetitions stop), or until a KV mismatch is determined at every prior offset (in which case all the repetitions down to and including prior offset '0' are complete).

Figure 8:
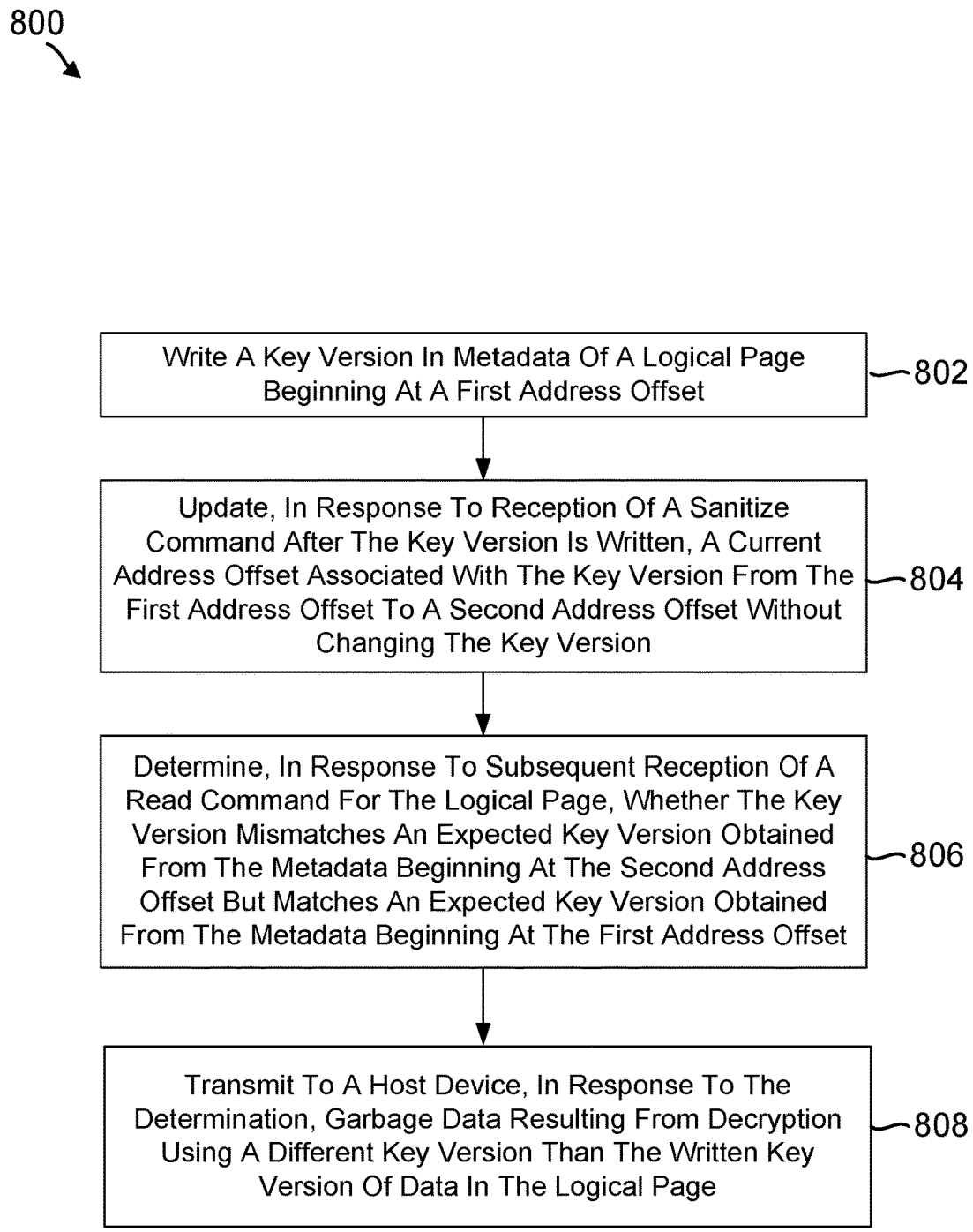
FIG. 8 is a flow chart illustrating an example of a method of managing a key version and processing host commands associated with sanitized logical pages following a single sanitize command, as performed by the storage device of FIG. 1.

FIG. 8 illustrates an example flow chart 800 of a method of managing a key version and processing host commands associated with sanitized logical pages following a single sanitize command in a storage device. For example, the method can be carried out in a storage device 102 such as the one illustrated in FIG. 1. Each of the steps in the flow chart can be controlled using the controller as described below (e.g. controller 123), by a component or module of the controller (e.g., a SPE), or by some other suitable means.

At block 802, the controller writes a key version in metadata of a logical page beginning at a first address offset. For instance, controller 123 may write KV 128 in metadata 404 of logical page 402 beginning at prior KV offset 410.

At block 804, the controller updates, in response to reception of a sanitize command after the key version is written, a current address offset associated with the key version from the first address offset to a second address offset without changing the key version. For instance, controller 123 may receive sanitize command 130 from host device 104 after writing KV 128 in metadata 404. In response to receiving the sanitize command, controller 123 may update KV field offset 132 from offset '0' (corresponding to prior KV offset 410) to offset '1' (corresponding to new KV offset 412) without changing the value of KV 128.

At block 806, the controller determines, in response to a subsequent reception of a read command for the logical page, whether the key version mismatches an expected key version obtained from the metadata beginning at the second address offset but matches an expected key version obtained from the metadata beginning at the first address offset. For instance, controller 123 may determine that KV 128 does not match an expected KV (e.g., in KV field 406) obtained from metadata 404 at new KV offset 412 but matches an expected KV obtained from metadata 404 at prior KV offset 410 (e.g., corresponding to a same position as KV field 306), since KV 128 is actually stored in the metadata beginning at prior KV offset 410.

At block 808, the controller transmits to a host device, in response to the determination, garbage data resulting from decryption using a different key version than the written key version of data in the logical page. For instance, in response to determining that KV 128 does not match the expected KV in KV field 406 at new KV offset 412 but matches the expected KV at prior KV offset 410 (e.g., corresponding to KV field 306), controller 123 may determine logical page 402 is a sanitized logical page. Therefore, controller 123 may decrypt the data 119 stored in logical page 402 using a different KV than the KV 128 used to encrypt the data and stored in metadata 404, thereby arriving at garbage data following the decryption, and the controller may transmit to host device 104 the garbage data in response to a read command. In some aspects, the different key version is the expected key version obtained from the metadata beginning at the current address offset. For instance, the different KV than KV 128 may be the expected KV in KV field 406 (the mismatched KV) which the controller obtained from metadata 404 at new KV offset 412.

In some aspects, the controller may transmit an error message to the host device indicating a key version mismatch error in response to determining that the key version mismatches the expected key versions respectively obtained from the metadata beginning at the second address offset and at the first address offset. For instance, controller 123 may determine that KV 128 does not match an expected KV (e.g., in KV field 406) obtained from metadata 404 at new KV offset 412 and also does not match an expected KV obtained from metadata 404 at prior KV offset 410 (e.g., corresponding to a same position as KV field 306). As a result of the KV mismatches, controller 123 may determine an error occurred in writing or reading the KV 128 from logical page 402, and therefore transmit an error message to the host device 104 indicating a failed read command due to this KV mismatch error.

In some aspects, the controller may write, in response to reception of a write command from the host device after the current address offset is updated, the key version in the metadata of the logical page beginning at the current address offset. For instance, in response to receiving a write command from host device 104 to write data 119 in logical page 402 after KV field offset 132 is updated from '0' to '1', controller 123 may write the KV 128 used to encrypt the data 119 in the logical page 402 beginning at new KV offset 412 (corresponding to offset '1').

In some aspects, the controller may read, in response to reception of a read command from the host device after the current address offset is updated, the expected key version in the metadata of the logical page beginning at the current address offset. For instance, in response to receiving a read command from host device 104 to read data 119 in logical page 402 after KV field offset 132 is updated from '0' to '1', controller 123 may read the KV 128 used to decrypt the data 119 in the logical page 402 beginning at new KV offset 412 (corresponding to offset '1').

In some aspects, the second address offset differs by a quantity of bits or bytes with respect to the first address offset, the quantity being based on a size of the metadata and a maximum quantity of sanitize commands to be received prior to a format command from the host device. For instance, as illustrated in FIG. 4, new KV offset 412 may be shifted by one byte with respect to prior KV offset 410. In this example, the controller 123 may shift the KV field 406 (the KV offset field in FIG. 4) by one byte in response to each sanitize command based on metadata 404 having a length or size of n bytes and the quantity of sanitize commands at the storage device 102 to be received prior to a format command from the host device being n–m commands, since this arrangement may allow the controller to avoid a circular shift in KV field 406. In other examples, the controller may shift KV field 406 (the same KV offset field in FIG. 4) by different amounts of bytes (or bits) for other sizes of metadata 404 or other quantities of sanitize commands to be received prior to a format command from the host device.

In some aspects, the metadata includes a first field for the key version and a second field for a different parameter than the key version, and the second field is separated into multiple segments surrounding the first field in response to the current address offset being updated following the sanitize command. For instance, metadata 404 may include KV field 406 for storing KV 128, and other parameters 408 or fields for storing other control data. Following the update to KV field offset 132 in response to sanitize command 130, and in response to the corresponding one-byte shift of KV field 406 in metadata 404 with respect to KV field 306 in metadata 304, the other parameters 408 field may be separated into two segments surrounding the KV field 406. For instance, as illustrated in FIG. 4, one byte of the other metadata may be on one side of KV field 406 while the remaining n−m−1 bytes of the other metadata may be on the other side of KV field 406.

In some aspects, the controller may update the current address offset from the second address offset to a k+1$^{th}$ address offset without changing the key version in response to reception of k sanitize commands including the sanitize command, where k>1. For instance, after receiving k=2 sanitize commands from host device 104, the controller 123 may update the value of KV field offset 132 from '0' to '1' in response to the first sanitize command and then from '1' to '2' in response to the second sanitize command 130, again without changing the value of KV 128. The controller may then transmit the garbage data resulting from decryption using the different key version in response to a determination that the key version mismatches an expected key version obtained from the metadata at the k+1$^{th}$ address offset but matches one of a plurality of expected key versions respectively obtained from the metadata at different address offsets including at least the second address offset. For instance, in response to determining that KV 128 does not match the expected KV in metadata 404 at offset '2' (the third address offset) but matches the expected KV in metadata 404 at prior offset '1' (the second address offset), or in response to further determining that KV 128 also does not match the expected KV in metadata 404 at offset '1' (the second address offset) but matches the expected KV at prior offset '0' (the first address offset), controller 123 may determine logical page 402 is a sanitized logical page. Therefore, controller 123 may decrypt the data 119 stored in logical page 402 using a different KV than the KV 128 used to encrypt the data and stored in metadata 404, thereby arriving at garbage data following the decryption, and the controller may transmit to host device 104 the garbage data in response to a read command.

In some aspects, the metadata includes a first field for the key version and a second field for a different parameter than the key version, and the second field is shifted with respect to the first field in response to the current address offset being updated following the n sanitize commands. For instance, metadata 604 may include KV field 606 for storing KV 128, and other parameters 608 or fields for storing other control data. Following k updates to KV field offset 132 in response to sanitize command 130, and in response to the corresponding k, one-byte shifts of KV field 606 in metadata 604 with respect to KV field 306 in metadata 304, the other parameters 608 field may be shifted with respect to the KV field 606. For instance, as illustrated in FIG. 6, the positions of KV field 606 and the other parameters 608 field may be shifted with respect to the positions of KV field 306 and the other parameters 308 field in FIG. 3.

In some aspects, the controller may read, in response to reception of a read command from the host device after the current address offset is updated, the expected key version in the metadata of the logical page beginning at the second address offset. For instance, in response to receiving a read command from host device 104 for data 119 in logical page 402 after updating KV field offset 132 from offset '0' to '1', the controller 123 may read the expected KV (e.g., in KV field 406) in metadata 404 beginning at new KV offset 412. The controller may then first determine whether the key version mismatches the expected key version read from the metadata beginning at the second address offset. For instance, the controller 123 may determine that the KV 128 does not match the expected KV (e.g., in KV field 406). Afterwards, the controller may read, in response to the first determination, the expected key version in the metadata of the logical page beginning at the first address offset. For instance, the controller 123 may read the expected KV in metadata 404 beginning at prior KV offset 410 (e.g., corresponding to the position of KV field 306). The controller may then second determine whether the key version matches the expected key version obtained from the metadata beginning at the first address offset. For instance, the controller 123 may determine that the KV 128 matches this expected KV (e.g., in KV field 306). As a result, the controller may transmit the garbage data in response to the second determination. For instance, controller 123 may decrypt the data 119 stored in logical page 402 using a different KV than the KV 128 used to encrypt the data and stored in metadata 404, thereby arriving at garbage data following the decryption, and the controller may transmit to host device 104 the garbage data in response to the read command.

Figure 9:
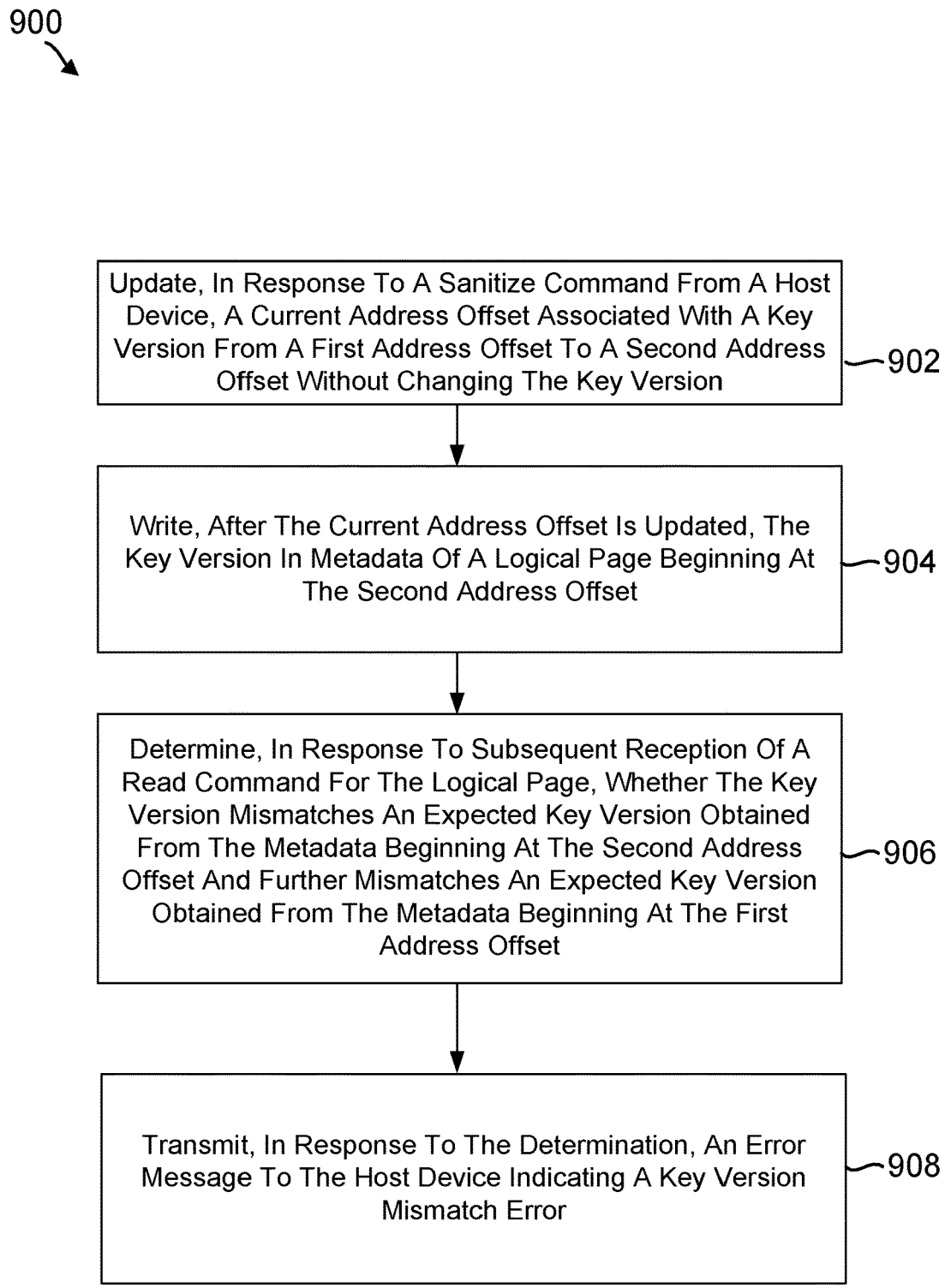
FIG. 9 is a flow chart illustrating an example of a method of managing a key version and processing host commands associated with non-sanitized logical pages following a single sanitize command, as performed by the storage device of FIG. 1.

FIG. 9 illustrates an example flow chart 900 of a method of managing a key version and processing host commands associated with non-sanitized logical pages following a single sanitize command in a storage device. For example, the method can be carried out in a storage device 102 such as the one illustrated in FIG. 1. Each of the steps in the flow chart can be controlled using the controller as described below (e.g. controller 123), by a component or module of the controller (e.g., a SPE), or by some other suitable means.

At block 902, the controller updates, in response to a sanitize command from a host device, a current address offset associated with a key version from a first address offset to a second address offset without changing the key version. For instance, controller 123 may receive sanitize command 130 from host device 104. In response to receiving the sanitize command, controller 123 may update KV field offset 132 from offset '0' (corresponding to prior KV offset 410) to offset '1' (corresponding to new KV offset 412) without changing the value of KV 128.

At block 904, the controller writes, after the current address offset is updated, the key version in metadata of a logical page beginning at the second address offset. For instance, after updating the KV field offset 132, controller 123 may write KV 128 in metadata 404 of logical page 402 beginning at new KV offset 412.

At block 906, the controller determines, in response to subsequent reception of a read command for the logical page, whether the key version mismatches an expected key version obtained from the metadata beginning at the second address offset and further mismatches an expected key version obtained from the metadata beginning at the first address offset. For instance, controller 123 may determine that, due to a KV read error, KV write error or other error in the storage device, KV 128 does not match an expected KV (e.g., in KV field 406) obtained from metadata 404 at new KV offset 412. Controller 123 may also determine that KV 128 does not match an expected KV obtained from metadata 404 at prior KV offset 410 (e.g., corresponding to a same position as KV field 306), since KV 128 is actually stored in the metadata beginning at KV offset 412 but was misread due to the device error.

At block 908, the controller transmits, in response to the determination, an error message to the host device indicating a key version mismatch error. For instance, as a result of the KV mismatches determined at block 906, controller 123 may determine an error occurred in writing or reading the KV 128 from logical page 402, and therefore transmit an error message to the host device 104 indicating a failed read command due to this KV mismatch error.

In some aspects, the controller may transmit data in the logical page to the host device in response to determining that the key version matches the expected key version obtained from the metadata beginning at the second address offset. For instance, if KV 128 stored in the metadata beginning at KV offset 412 was read correctly (not misread due to a device error), then controller 123 may determine that KV 128 does match an expected KV (e.g., in KV field 406) obtained from metadata 404 at new KV offset 412. In such case, controller 123 may decrypt the data 119 stored in logical page 402 using the KV 128 used to encrypt the data and stored in metadata 404, thereby arriving at valid host data following the decryption, and the controller may transmit to host device 104 the host data in response to a read command.

In some aspects, the controller may update the current address offset from the second address offset to a $k+1^{th}$ address offset without changing the key version in response to reception of k sanitize commands including the sanitize command, where k>1. For instance, after receiving k=2 sanitize commands from host device 104, the controller 123 may update the value of KV field offset 132 from '0' to '1' in response to the first sanitize command and then from '1' to '2' in response to the second sanitize command 130, again without changing the value of KV 128. The controller may then transmit the error message in response to a determination that the key version mismatches each of a plurality of expected key versions respectively obtained from the metadata at different address offsets including at least the $k+1^{th}$ address offset and the second address offset. For instance, as a result of a device error in reading or writing the KV 128 in metadata 404, the controller 123 may determine that KV 128 does not match the expected KV in metadata 404 at offset '2' (the third address offset), that KV 128 does not match the expected KV in metadata 404 at prior offset '1' (the second address offset), and that KV 128 does not match the expected KV at prior offset '0' (the first address offset). In such case, the controller may transmit an error message to the host device 104 indicating a failed read command due to these KV mismatch errors.

In some aspects, the controller may transmit garbage data resulting from decryption using a different key version than the written key version of data in the logical page in response to a determination that the key version mismatches an expected key version obtained from the metadata at the $k+1^{th}$ address offset but matches one of a plurality of expected key versions respectively obtained from the metadata at different address offsets including at least the second address offset. For instance, after updating the value of KV field offset 132 incrementally to '2' in response to k=2 sanitize commands, the controller 123 may determine either that KV 128 does not match the expected KV in metadata 404 at offset '2' (the third address offset) but matches the expected KV in metadata 404 at prior offset '1' (the second address offset), or that the KV 128 does not match the expected KV in metadata at offsets '2' (the third address offset) and '1' (the second address offset) but matches the expected KV at prior offset '0' (the first address offset). In either case, controller 123 may determine logical page 402 is a sanitized logical page, and so controller 123 may decrypt the data 119 stored in logical page 402 using a different KV than the KV 128 used to encrypt the data and stored in metadata 404, thereby arriving at garbage data following the decryption. The controller may then transmit to host device 104 the garbage data.

In some aspects, the controller may read, in response to reception of a read command from the host device after the current address offset is updated, the expected key version in the metadata of the logical page beginning at the second address offset. For instance, in response to receiving a read command from host device 104 for data 119 in logical page 402 after updating KV field offset 132 from offset '0' to '1', the controller 123 may read the expected KV (e.g., in KV field 406) in metadata 404 beginning at new KV offset 412. The controller may then first determine whether the key version mismatches the expected key version read from the metadata beginning at the second address offset. For instance, the controller 123 may determine that the KV 128 does not match the expected KV (e.g., in KV field 406). Afterwards, the controller may read, in response to the first determination, the expected key version in the metadata of the logical page beginning at the first address offset. For instance, the controller 123 may read the expected KV in metadata 404 beginning at prior KV offset 410 (e.g., corresponding to the position of KV field 306). The controller may then second determine whether the key version further mismatches the expected key version obtained from the metadata beginning at the first address offset. For instance, the controller 123 may determine that the KV 128 also does not match this expected KV (e.g., in KV field 306). As a result, the controller may transmit the error message in response to the second determination. For instance, the controller 123 may transmit an error message to the host device 104 indicating a failed read command due to these KV mismatch errors.

Figure 10:
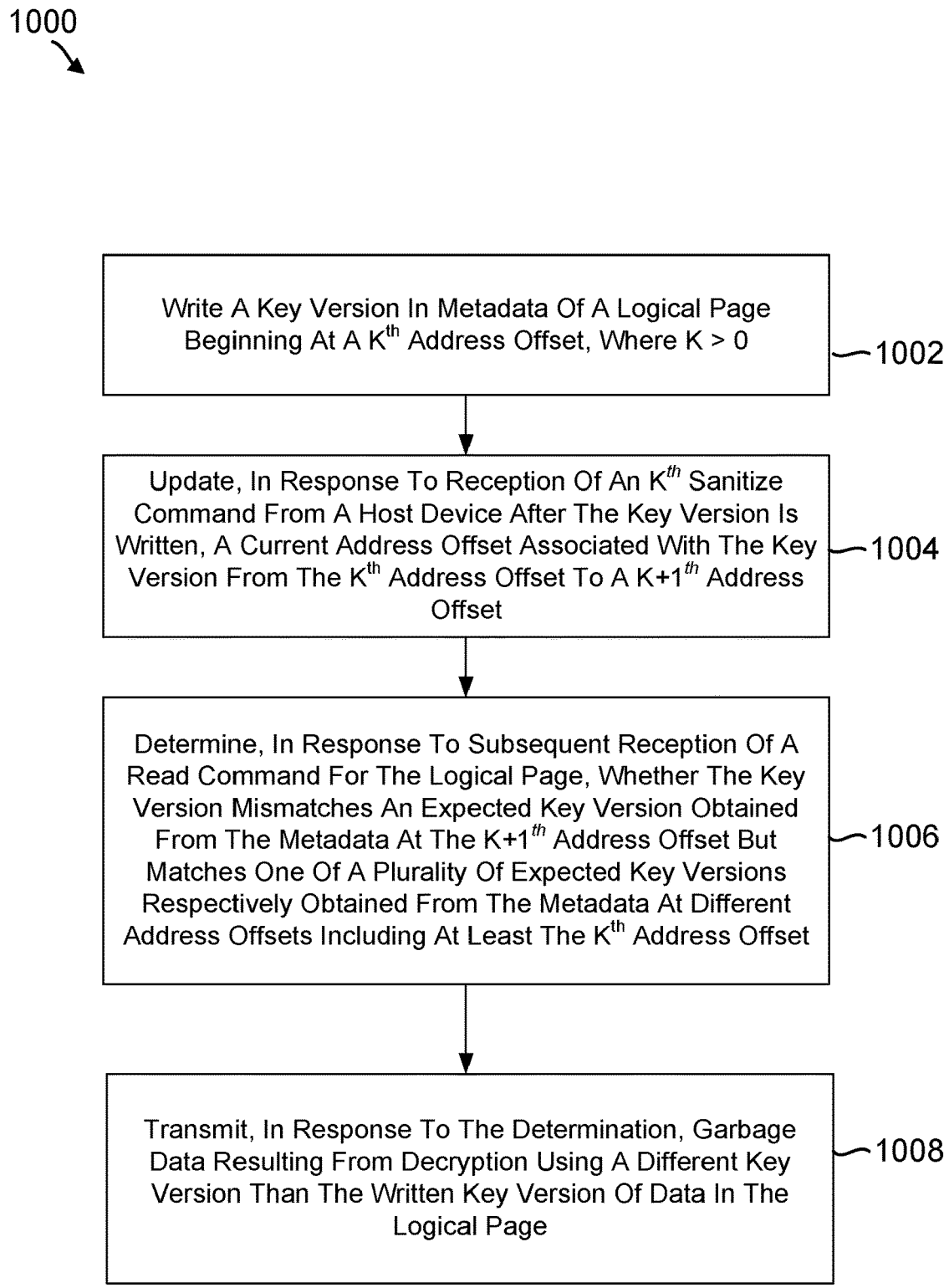
FIG. 10 is a flow chart illustrating an example of a method of managing a key version and processing host commands associated with sanitized logical pages following multiple sanitize commands, as performed by the storage device of FIG. 1.

FIG. 10 illustrates an example flow chart 1000 of a method of managing a key version and processing host commands associated with sanitized logical pages following multiple sanitize commands in a storage device. For example, the method can be carried out in a storage device 102 such as the one illustrated in FIG. 1. Each of the steps in the flow chart can be controlled using the controller as described below (e.g. controller 123), by a component or module of the controller (e.g., a SPE), or by some other suitable means.

At block 1002, the controller may write a key version in metadata of a logical page beginning at a $k^{th}$ address offset, where k>0. For instance, after receiving k sanitize commands, controller 123 may write KV 128 in metadata 504 of logical page 502 beginning at prior KV offset 510.

At block 1004, the controller may update, in response to reception of a $k^{th}$ sanitize command from a host device after the key version is written, a current address offset associated with the key version from the $k^{th}$ address offset to a $k+1^{th}$ address offset. For instance, controller 123 may receive a k+1th, sanitize command 130 from host device 104 after storing KV 128 in metadata 504. In response to receiving the k+1th sanitize command, controller 123 may update KV field offset 132 from offset 'k' (corresponding to prior KV offset 510) to offset 'k+1' (corresponding to new KV offset 512) without changing the value of KV 128.

At block 1006, the controller may determine, in response to subsequent reception of a read command for the logical page, whether the key version mismatches an expected key version obtained from the metadata at the $k+1^{th}$ address offset but matches one of a plurality of expected key versions respectively obtained from the metadata at different address offsets including at least the $k^{th}$ address offset. For instance, the controller may read, in response to reception of a read command from the host device after the current address offset is updated, the expected key version in the metadata of the logical page beginning at the current address offset; compare the key version with the expected key version read from the metadata beginning at the current address offset; and repeat the read and compare at the different address offsets until a match is determined between the key version and the expected key version at one of the different address offsets other than the current address offset. For example, in response to receiving a read command from host device 104 for logical page 502 after the value of KV field offset 132 is updated to 'k+1', controller 123 may determine that KV 128 does not match the expected KV in metadata 504 at new KV offset 512 (the $k+1^{th}$ or current address offset) but matches the expected KV in metadata 504 at prior KV offset 510 (the $k^{th}$ address offset), or that KV 128 does not match the expected KV in metadata 504 at prior KV offset 510 (the $k^{th}$ address offset) but matches the expected KV in metadata 504 at offset 'k−1', or that KV 128 does not match the expected KV in metadata 504 at offset 'k−1' but matches at offset 'k−2', or that KV 128 does not match the expected KV at offset 'k−2' but matches at offset 'k−3', or that KV does not match at offset 'k−3' but matches at offset 'k−4', or does not match at offset 'k−4' but matches at offset '0' (k−5 in this example). In either case, controller 123 may determine logical page 502 is a sanitized logical page.

At block 1008, the controller may transmit, in response to the determination or match at block 1006, garbage data resulting from decryption using a different key version than the written key version of data in the logical page. For instance, in response to determining that logical page 502 is a sanitized logical page at block 1006, controller 123 may decrypt the data 119 stored in logical page 502 using a different KV than the KV 128 used to encrypt the data and stored in metadata 504, thereby arriving at garbage data following the decryption, and the controller may transmit to host device 104 the garbage data in response to a read command.

In some aspects, the controller may read, in response to reception of a read command from the host device after the current address offset is updated, the expected key version in the metadata of the logical page beginning at the current address offset; compare the key version with the expected key version read from the metadata beginning at the current address offset; repeat the read and compare at the different address offsets until a mismatch is determined between the key version and each of the expected key versions respectively at the different address offsets including the current address offset; and transmit an error message to the host device indicating a key version mismatch error in response to the mismatches (a mismatch for every comparison). For example, in response to receiving a read command from host device 104 for logical page 502 after the value of KV field offset 132 is updated to 'k+1', controller 123 may determine that KV 128 does not match the expected KV in metadata 504 at new KV offset 512 (the $k+1^{th}$ or current address offset), that KV 128 does not match the expected KV in metadata 504 at prior KV offset 510 (the $k^{th}$ address offset), that KV 128 does not match the expected KV in metadata 504 at offset 'k−1', that KV 128 does not match the expected KV at offset 'k−2', that the KV does not match at offset 'k−3', that the KV does not match at offset 'k−4', and that the KV does not match at offset '0' (k−5 in this example). As a result, the controller 123 may transmit an error message to the host device 104 indicating a failed read command due to these KV mismatch errors.

Figure 11:
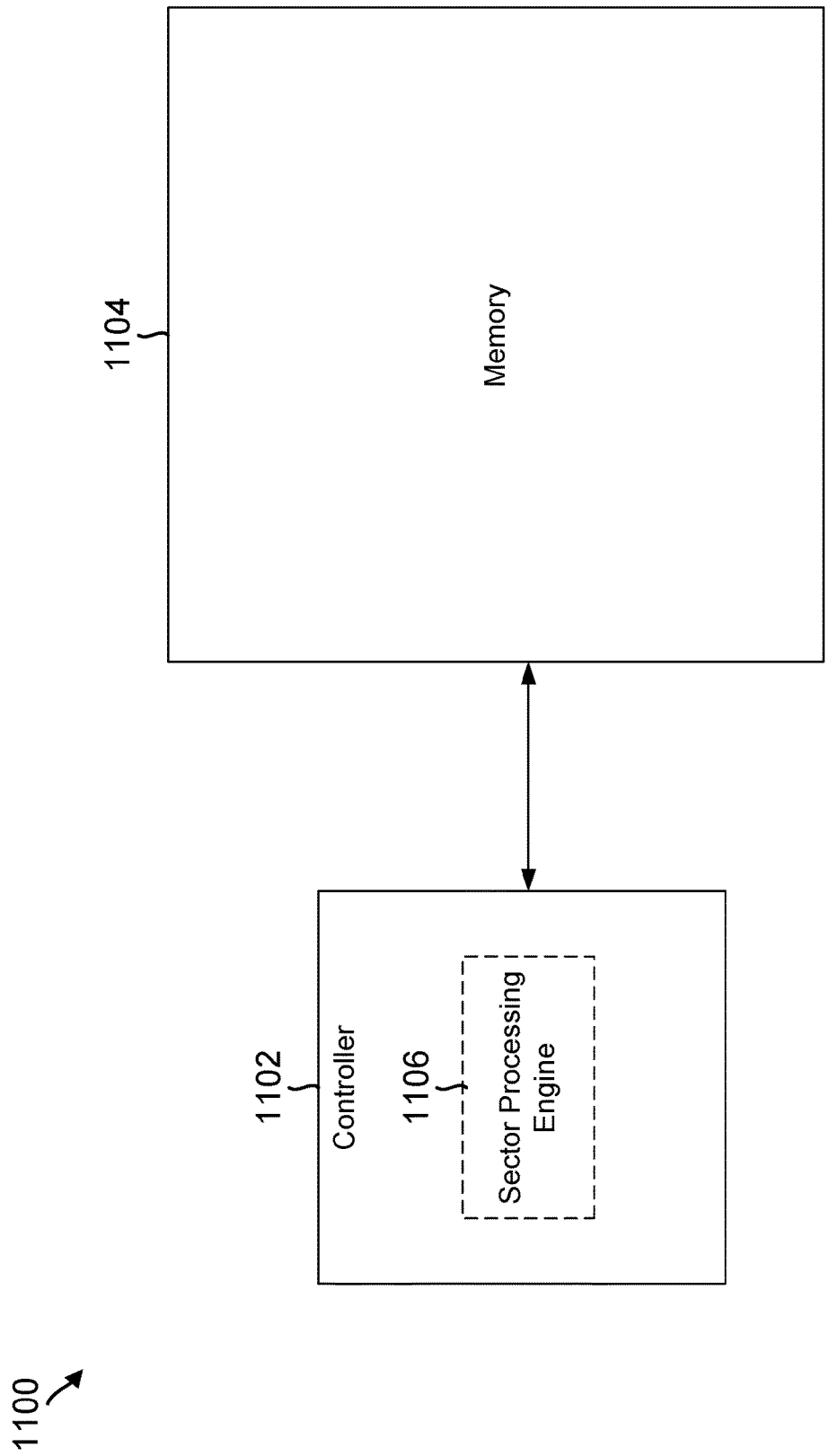
FIG. 11 is a conceptual diagram illustrating an example of a controller that manages a key version and processes host commands associated with sanitized and non-sanitized logical pages in the storage device of FIG. 1.

FIG. 11 is a conceptual diagram illustrating an example 1100 of a controller 1102 coupled to a memory 1104 in a storage device. For example, controller 1102 may correspond to controller 123, and memory 1104 may correspond to the NVM 110, 201 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 1102 includes a sector processing engine (SPE 1106) that may provide a means for writing a key version in metadata of a logical page beginning at a first address offset; updating, in response to reception of a sanitize command after the key version is written, a current address offset associated with the key version from the first address offset to a second address offset without changing the key version; determining, in response to subsequent reception of a read command for the logical page, whether the key version mismatches an expected key version obtained from the metadata beginning at the second address offset but matches an expected key version obtained from the metadata beginning at the first address offset; and transmitting to a host device, in response to the determination, garbage data resulting from decryption using a different key version than the written key version of data in the logical page. For example, the SPE 1106 may perform the process described above with respect to FIG. 8.

In one example, the SPE 1106 may provide a means for updating, in response to a sanitize command from a host device, a current address offset associated with a key version from a first address offset to a second address offset without changing the key version; writing, after the current address offset is updated, the key version in metadata of a logical page beginning at the second address offset; determining, in response to subsequent reception of a read command for the logical page, whether the key version mismatches an expected key version obtained from the metadata beginning at the second address offset and further mismatches an expected key version obtained from the metadata beginning at the first address offset; and transmitting, in response to the determination, an error message to the host device indicating a key version mismatch error. For example, the SPE 1106 may perform the process described above with respect to FIG. 9.

In one example, the SPE 1106 may provide a means for writing a key version in metadata of a logical page beginning at a $k^{th}$ address offset, wherein k>0; updating, in response to reception of a $k^{th}$ sanitize command from a host device after the key version is written, a current address offset associated with the key version from the $k^{th}$ address offset to a $k+1^{th}$ address offset; determining, in response to subsequent reception of a read command for the logical page, whether the key version mismatches an expected key version obtained from the metadata at the $k+1^{th}$ address offset but matches one of a plurality of expected key versions respectively obtained from the metadata at different address offsets including at least the $k^{th}$ address offset; and transmitting, in response to the determination, garbage data resulting from decryption using a different key version than the written key version of data in the logical page. For example, the SPE 1106 may perform the process described above with respect to FIG. 10.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to all types of storage devices capable of storing data. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a controller configured to:
   write a key version in metadata of a logical page beginning at a first address offset;
   update, in response to reception of a sanitize command after the key version is written, a current address offset associated with the key version from the first address offset to a second address offset without changing the key version;
   determine, in response to subsequent reception of a read command for the logical page, whether the key version mismatches an expected key version obtained from the metadata beginning at the second address offset but matches an expected key version obtained from the metadata beginning at the first address offset; and
   transmit to a host device, in response to the determination, garbage data resulting from decryption using a different key version than the written key version of data in the logical page.

2. The storage device of claim 1, wherein the controller is configured to:
   transmit an error message to the host device indicating a key version mismatch error in response to determining that the key version mismatches the expected key versions respectively obtained from the metadata beginning at the second address offset and at the first address offset.

3. The storage device of claim 1, wherein the controller is configured to:
   write, in response to reception of a write command from the host device after the current address offset is updated, the key version in the metadata of the logical page beginning at the current address offset.

4. The storage device of claim 1, wherein the controller is configured to:
   read, in response to reception of the read command from the host device after the current address offset is updated, the expected key version in the metadata of the logical page beginning at the current address offset.

5. The storage device of claim 1, wherein the different key version is the expected key version obtained from the metadata beginning at the current address offset.

6. The storage device of claim 1, wherein the second address offset differs by a quantity of bits or bytes with respect to the first address offset, the quantity being based on a size of the metadata and a maximum quantity of sanitize commands to be received prior to a format command from the host device.

7. The storage device of claim 1, wherein the metadata includes one field for the key version and another field for a different parameter than the key version, and another field is separated into multiple segments surrounding the one field in response to the current address offset being updated following the sanitize command.

8. The storage device of claim 1, wherein the controller is configured to:
   update the current address offset from the second address offset to a k+1$^{th}$ address offset without changing the key version in response to reception of k sanitize commands including the sanitize command, wherein k>1; and
   transmit the garbage data resulting from decryption using the different key version in response to a determination that the key version mismatches an expected key version obtained from the metadata at the k+1$^{th}$ address offset but matches one of a plurality of expected key versions respectively obtained from the metadata at different address offsets including at least the second address offset.

9. The storage device of claim 8, wherein the metadata includes one field for the key version and another field for a different parameter than the key version, and the another field is shifted with respect to the one field in response to the current address offset being updated following the k sanitize commands.

10. The storage device of claim 1, wherein the controller is configured to:
    read, in response to reception of the read command from the host device after the current address offset is updated, the expected key version in the metadata of the logical page beginning at the second address offset;
    first determine whether the key version mismatches the expected key version read from the metadata beginning at the second address offset;
    read, in response to the first determination, the expected key version in the metadata of the logical page beginning at the first address offset;
    second determine whether the key version matches the expected key version obtained from the metadata beginning at the first address offset; and
    transmit the garbage data in response to the second determination.

11. A storage device, comprising:
    a controller configured to:
    update, in response to a sanitize command from a host device, a current address offset associated with a key version from a first address offset to a second address offset without changing the key version;
    write, after the current address offset is updated, the key version in metadata of a logical page beginning at the second address offset;
    determine, in response to subsequent reception of a read command for the logical page, whether the key version mismatches an expected key version obtained from the metadata beginning at the second address offset and further mismatches an expected key version obtained from the metadata beginning at the first address offset; and
    transmit, in response to the determination, an error message to the host device indicating a key version mismatch error.

12. The storage device of claim 11, wherein the controller is configured to:
transmit data in the logical page to the host device in response to determining that the key version matches the expected key version obtained from the metadata beginning at the second address offset.

13. The storage device of claim 11, wherein the controller is configured to:
update the current address offset from the second address offset to a k+1$^{th}$ address offset without changing the key version in response to reception of k sanitize commands including the sanitize command, wherein k>1.

14. The storage device of claim 13, wherein the controller is configured to:
transmit the error message in response to a determination that the key version mismatches each of a plurality of expected key versions respectively obtained from the metadata at different address offsets including at least the k+1$^{th}$ address offset and the second address offset.

15. The storage device of claim 13, wherein the controller is configured to:
transmit garbage data resulting from decryption using a different key version than the written key version of data in the logical page in response to a determination that the key version mismatches an expected key version obtained from the metadata at the k+1$^{th}$ address offset but matches one of a plurality of expected key versions respectively obtained from the metadata at different address offsets including at least the second address offset.

16. The storage device of claim 11, wherein the controller is configured to:
read, in response to reception of the read command from the host device after the current address offset is updated, the expected key version in the metadata of the logical page beginning at the second address offset;
first determine whether the key version mismatches the expected key version read from the metadata beginning at the second address offset;
read, in response to the first determination, the expected key version in the metadata of the logical page beginning at the first address offset;
second determine whether the key version further mismatches the expected key version obtained from the metadata beginning at the first address offset; and
transmit the error message in response to the second determination.

17. A storage device, comprising:
a controller configured to:
write a key version in metadata of a logical page beginning at a k$^{th}$ address offset, wherein k>0;
update, in response to reception of a k$^{th}$ sanitize command from a host device after the key version is stored, a current address offset associated with the key version from the k$^{th}$ address offset to a k+1$^{th}$ address offset;
determine, in response to subsequent reception of a read command for the logical page, whether the key version mismatches an expected key version obtained from the metadata at the k+1$^{th}$ address offset but matches one of a plurality of expected key versions respectively obtained from the metadata at different address offsets including at least the k$^{th}$ address offset; and
transmit, in response to the determination, garbage data resulting from decryption using a different key version than the written key version of data in the logical page.

18. The storage device of claim 17, wherein the controller is configured to:
read, in response to reception of the read command from the host device after the current address offset is updated, the expected key version in the metadata of the logical page beginning at the current address offset;
compare the key version with the expected key version read from the metadata beginning at the current address offset;
repeat the read and compare at the different address offsets until a match is determined between the key version and the expected key version at one of the different address offsets other than the current address offset; and
transmit the garbage data in response to the match.

19. The storage device of claim 17, wherein the controller is configured to:
read, in response to reception of a read command from the host device after the current address offset is updated, the expected key version in the metadata of the logical page beginning at the current address offset;
compare the key version with the expected key version read from the metadata beginning at the current address offset;
repeat the read and compare at the different address offsets until a mismatch is determined between the key version and each of the expected key versions respectively at the different address offsets including the current address offset; and
transmit an error message to the host device indicating a key version mismatch error in response to the mismatches.

20. The storage device of claim 17, wherein the sanitize command is a cryptographic erase command.

* * * * *